US012810866B2

(12) United States Patent
Spitzer-Williams et al.

(10) Patent No.: US 12,810,866 B2
(45) Date of Patent: Nov. 24, 2026

(54) METHODS, NON-TRANSITORY COMPUTER READABLE MEDIA, AND SYSTEMS OF TRANSCRIPTION USING MULTIPLE RECORDING DEVICES

(71) Applicant: Axon Enterprise, Inc., Scottsdale, AZ (US)

(72) Inventors: Noah Spitzer-Williams, Seattle, WA (US); Thomas Crosley, Seattle, WA (US); Choongyeun Cho, Bellevue, WA (US); James Reitz, Bainbridge Island, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 562 days.

(21) Appl. No.: 17/899,513

(22) Filed: Aug. 30, 2022

(65) Prior Publication Data

US 2023/0074279 A1 Mar. 9, 2023

Related U.S. Application Data

(60) Provisional application No. 63/239,245, filed on Aug. 31, 2021.

(51) Int. Cl.
*G10L 15/26* (2006.01)
*G10L 15/32* (2013.01)
*G10L 21/0208* (2013.01)

(52) U.S. Cl.
CPC .............. *G10L 15/26* (2013.01); *G10L 15/32* (2013.01); *G10L 21/0208* (2013.01)

(58) Field of Classification Search
CPC .......... G01S 11/06; G01S 13/08; G01S 15/08; G08B 13/1427; H04B 17/318; H04S 7/30; H04R 3/005; G10L 15/32; G10L 2015/088; G10L 15/20; G10L 19/00; G10L 21/06
See application file for complete search history.

(56) References Cited

U.S. PATENT DOCUMENTS

| | | | | |
|---|---|---|---|---|
| 6,542,866 | B1 * | 4/2003 | Jiang | G10L 15/02 704/256.4 |
| 8,060,364 | B2 | 11/2011 | Bacher et al. | |
| 8,560,314 | B2 | 10/2013 | Koll et al. | |
| 8,612,526 | B2 | 12/2013 | Jackson et al. | |
| 9,710,460 | B2 | 7/2017 | Brown et al. | |
| 10,120,919 | B2 | 11/2018 | Olligschlaeger et al. | |

(Continued)

*Primary Examiner* — Richemond Dorvil
(74) *Attorney, Agent, or Firm* — Andrew Graham

(57) ABSTRACT

Examples of systems and methods for audio transcription are described. Audio data may be obtained from multiple recording devices at or near a scene. Audio data from multiple recording devices may be used to generate a final transcription. For example, when transcribing audio data from one recording device, audio data from another recording device may be used to generate the final transcript. The data from the second recording device may be used when it is determined that the recording devices were in proximity at the time the relevant portions of audio data were recorded and/or when a portion of the audio from the second recording device is verified to correspond with a portion of the audio from the first recording device. In some examples, data from the second recording device may be used when data from the first recording device is determined to be of low quality.

20 Claims, 7 Drawing Sheets

(56) References Cited

U.S. PATENT DOCUMENTS

| | | | | |
|---|---|---|---|---|
| 10,349,093 | B2 | 7/2019 | Rai et al. | |
| 10,912,132 | B2 | 2/2021 | Boushley et al. | |
| 11,165,900 | B2 * | 11/2021 | Sachdev | H04M 1/656 |
| 11,869,491 | B2 * | 1/2024 | Hirao | G10L 15/22 |
| 2008/0215318 | A1 | 9/2008 | Zhang et al. | |
| 2015/0098686 | A1 * | 4/2015 | Obukhov | H04N 5/77<br>386/226 |
| 2015/0358780 | A1 * | 12/2015 | Saari | H04W 52/245<br>370/252 |
| 2016/0042767 | A1 * | 2/2016 | Araya | H04N 7/181<br>386/201 |
| 2016/0358606 | A1 * | 12/2016 | Ramprashad | G10L 15/32 |
| 2017/0364602 | A1 | 12/2017 | Reitz et al. | |
| 2019/0027184 | A1 * | 1/2019 | Ross | H04N 7/188 |
| 2019/0268566 | A1 | 8/2019 | Firpo et al. | |
| 2021/0174811 | A1 * | 6/2021 | Ebenezer | H04R 3/005 |

* cited by examiner

METHODS, NON-TRANSITORY COMPUTER READABLE MEDIA, AND SYSTEMS OF TRANSCRIPTION USING MULTIPLE RECORDING DEVICES

CROSS-REFERENCE TO RELATED APPLICATION(S)

This application claims priority to U.S. Provisional Application No. 63/239,245 filed Aug. 31, 2021, which is incorporated herein by reference, in its entirety, for any purpose.

TECHNICAL FIELD

Examples described herein relate generally to transcribing audio data using multiple recording devices at an event. Audio recorded by a second device may be used to transcribe audio recorded at a first device, for example.

BACKGROUND

Recording devices may be used to record an event (e.g., incident). Recording devices at the scene (e.g., location) of an incident are becoming more ubiquitous due the development of body-worn cameras, body-worn wireless microphones, smart phones capable of recording video, and societal pressure that security personnel, such as police officers, carry and use such recording devices.

Existing recording devices generally work quite well for the person wearing the recording device or standing directly in front of it. However, the existing recording devices do not capture the spoken words of people in the surrounding nearly as well. For larger incidents, there may be multiple people each wearing a recording device at the scene of the same incident. While multiple recording devices record the same incident, each recording device likely captures and records (e.g., stores) the occurrences of the event from a different viewpoint.

DETAILED DESCRIPTION

There may be multiple recording devices that captured all or a portion of a particular incident. For example, multiple people wearing or carrying recording devices may be present at an incident, particularly a larger incident. While multiple recording devices record the same incident, each recording device likely captures and records (e.g., stores) the occurrences of the event from a different viewpoint. Examples described herein may advantageously utilize the audio from another recording device to perform the transcription—either by combining portion(s) of the audio recorded by multiple devices, and/or by comparing transcriptions or candidate transcriptions of the audio from multiple devices. When another device, and audio from that device are available to use in conducting transcription of audio from a particular device, examples described herein may verify the recording devices used were in proximity with one another at the time the audio was recorded. Examples described herein may verify that audio from multiple recording devices used for transcription was recorded at the same time (e.g., synchronously). In this manner, transcription of audio data may be performed using multiple recording devices present at the same incident, such as multiple recording devices in proximity to one another (e.g., within a threshold distance). The multiple recording devices may each capture audio data that may be combined during transcription, either by combining the audio data or combining transcriptions or candidate transcriptions of the audio. In some examples, the use of audio data from multiple devices may improve the accuracy of the transcription relative to what was actually said at the scene.

Examples according to various aspects of the present disclosure solve various technical problems associated with varying, non-ideal recording environments in which limited control may exist over placement and/or orientation of a recording device relative to an audio source. To improve subsequent processing of the audio data, additional information may be identified and applied to information from the audio data in one or manners that provide technical improvements to transcription of audio data recorded by an individual recording device. These improvements provide particular benefit to audio data recorded by mobile recording devices, including wearable cameras. In examples, the additional information may be automatically identified and applied after the audio data has been recorded and transmitted to a remote computing device, enabling a user of the recording device to focus on other activity at an incident, aside from monitoring or otherwise ensuring proper placement of the recording device to capture the audio data.

Figure 1:
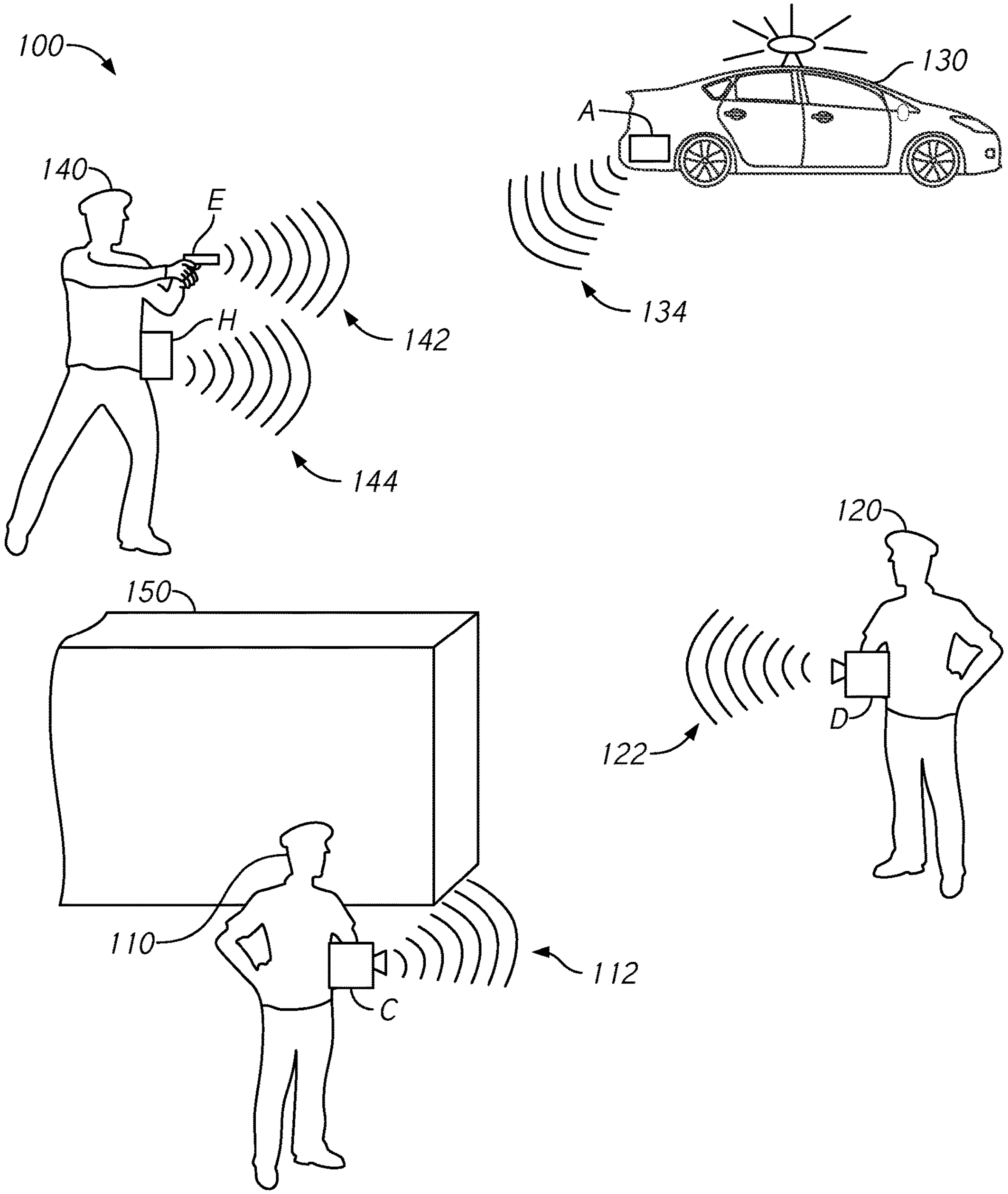
FIG. 1 is a schematic illustration of recording devices at a scene of an event transmitting and/or receiving event data in accordance with examples described herein.

FIG. 1 is a schematic illustration of multiple recording devices at a scene of an event. The multiple recording devices may record, transmit and/or receive audio data according to various aspects of the present disclosure. The event 100 includes a plurality of users 110, 120, 140, a vehicle 130, and recording devices A, C, D, E, and H. The recording devices at event 100 of FIG. 1 may include a conducted electrical weapon ("CEW") identified as recording device E, a holster for carrying a weapon identified as recording device H, a vehicle recording device in vehicle 130 that is identified as recording device A, a body-worn camera identified as recording device C, and another body-worn camera identified as recording device D. Additional, fewer, and/or different components and roles may be present in other examples.

Accordingly, examples of systems described herein may include one or more recording devices used to record audio from an event. Examples of recording devices which may be used include, but are not limited to a CEW, a camera, a recorder, a smart speaker, a body-worn camera, a holster having a camera and/or microphone. Generally, any device with a microphone and/or capable of recording audio signals may be used to implement a recording device as described herein.

Recording devices described herein may be positioned to record audio from an event (e.g., at a scene). Examples of events and scenes may include, but are not limited to, a crime scene, a traffic stop, an arrest, a police stop, a traffic incident, an accident, an interview, a demonstration, a concert, and/or a sporting event. The recording devices may be stationary and/or may be mobile—e.g., the recording devices may move by being carried by (e.g., attached to, worn) one or more individuals present at or near the scene.

Recording devices may perform other functions in addition to recording audio data in some examples. Referring to FIG. 1, recording devices E, H, and A may perform one or more functions in addition to recording audio data. Additional functions may include, for example, recording video, transmitting video or other data, operation as a weapon (e.g., CEW), operation as a cellular phone, holding a weapon (e.g., holster), detecting the operations of a vehicle (e.g., vehicle recording device), and/or providing a proximity signal (e.g., a location signal).

In the example of FIG. 1, user 140 carries CEW E and holster H. Users 120 and 110 respectively wear cameras D and C. Users 110, 120, and 140 may be personnel from a security agency. Users 110, 120, and 140 may be from the same agency and may have been dispatched to event 100. Although in this example the users are from the same agency, in other examples, users may be dispatched from different agencies, companies, employers, etc., and/or may be passers-by or observers at a scene.

CEW E may operate as a recording device by recording the operations performed by the CEW such as arming the CEW, disarming the CEW, and providing a stimulus current to a human or animal target to inhibit movement of a target. Holster H may operate as a recording device by recording the presence or absence of a weapon in the holster. Vehicle recording device A may operate as a recording device by recording the activities that occur with respect to vehicle 130 such as the driver's door opening, the lights being turn on, the siren being activated, the trunk being opened, the back door opening, removal of a weapon (e.g., shotgun) from a weapon holder, a sudden deacceleration of vehicle 130, and/or the velocity of vehicle 130. Alternately or additionally, vehicle recording device A may comprise a vehicle-mounted camera. The vehicle-mounted camera may comprise an image sensor and a microphone and be further configured to operate as a recording device by recording audiovisual information (e.g., data) regarding the happenings (e.g., occurrences) at event 100. Camera C and D may operate as recording devices by recording audiovisual information regarding the happenings at event 100. The audio information captured and stored (e.g., recorded) by a recording device regarding an event is referred to herein as audio data. In some examples, audio data may include time and location information (e.g., GPS information) about the recording device(s). In other examples, audio data may not include time or any indication of time. Audio data may in some examples include video data.

Audio data may be broadcast from one recording device to other devices in some examples. In some examples, audio data may be transmitted from a recording device to one or more other computing devices (not shown in FIG. 1). In some examples, audio data may be recorded and stored at the recording device (e.g., in a memory of the recording device) and may later be retrieved by the recording device and/or another computing device.

In some examples, a beacon signal may be transmitted from one recording device to another. The beacon signal may include and/or be used to derive proximity information—such as a distance between devices. In some examples, a beacon signal may be referred to as an alignment beacon. Upon broadcasting an alignment beacon, the broadcasting device may record alignment data (e.g., location information about the device having sent and/or received the beacon) in its own memory. In some examples, the beacon may include information which allows a receiving recording device to determine a proximity between the receiving recording device and the device having transmitted the beacon. For example, a signal strength may be measured at the receiving device and used to approximate a distance to the recording device providing the beacon. Along with the alignment data, the broadcasting device may record the current (e.g., present) time as maintained (e.g., tracked, measured) by the broadcasting device. Maintaining time may refer to tracking the passage of time, tracking the advance of time, detecting the passage of time, and/or to maintain and/or record a current time. For example, a clock maintains the time of day. The time recorded by the broadcasting device may relate the alignment data to the audio data being recorded by the broadcasting device at the time of broadcasting the alignment data.

In some examples, recording devices A, C, D, E, and H may transmit audio data and/or alignment beacons via communication links 134, 112, 122, 142, and 144, respectively using a wireless communication protocol. Preferably, recording devices transmit alignment beacons omni-directionally. Although communication links 134, 112, 122, 142, and 144 are shown as transmitting in what appears to be a single direction, recording devices A, C, D, E, and H may transmit omni-directionally.

A recording device may receive alignment beacons from one or more other recording devices. The receiving device records the alignment data from the received alignment beacon. The alignment data from each received alignment beacon may be stored with a time that relates the alignment data to the audio data in process of being recorded at the time of receipt of the alignment beacon or thereabout. Received alignment data may be stored with or separate from the event data (e.g., audio data) that is being recorded by the receiving recording device. A recording device may receive many alignment beacons from many other recording devices while recording an event. In this manner, by accessing the information about received alignment beacons and/or other beacon signals, a recording device or other computing device or system, may determine which recording devices are within a particular proximity at a given a time.

Each recording device may maintain its own time. A recording device may include a real-time clock or a crystal for maintaining time. The time maintained by one recording device may be independent of all other recording devices. The time maintained by a recording device may occasionally be set to a particular time by a server or other device; however, due for example to drift, the time maintained by each recording device may not in some examples be guaranteed to be the same. In some examples, time may be maintained cooperatively between one or more recording devices and a computing device in communication with the one or more recording devices.

A recording device may use the time that it maintains, or a derivative thereof, to progressively mark event data as event data is being recorded. Marking audio data with time indicates the time at which that portion of the event data was recorded. For example, a recording device may mark the start of event data as time zero, and record a time associated with the event data for each frame recorded so that the second frame is recorded at 33.3 milliseconds, the third frame at 66.7 milliseconds and so forth assuming that the recording device records video event data at 30 frames per second.

In the case of a CEW, the CEW may maintain its time and record the time of each occurrence of arming the device, disarming the device, and providing a stimulus signal.

The time maintained by a recording device to mark event data may be absolute time (e.g., UTC) or a relative time. In one example, the time of recording video data is measured by the elapse of time since beginning recording. The time that each frame is recorded is relative to the time of the beginning of the recording. The time used to mark recorded data may have any resolution such as microseconds, milliseconds, seconds, hours, and so forth.

Figure 2:
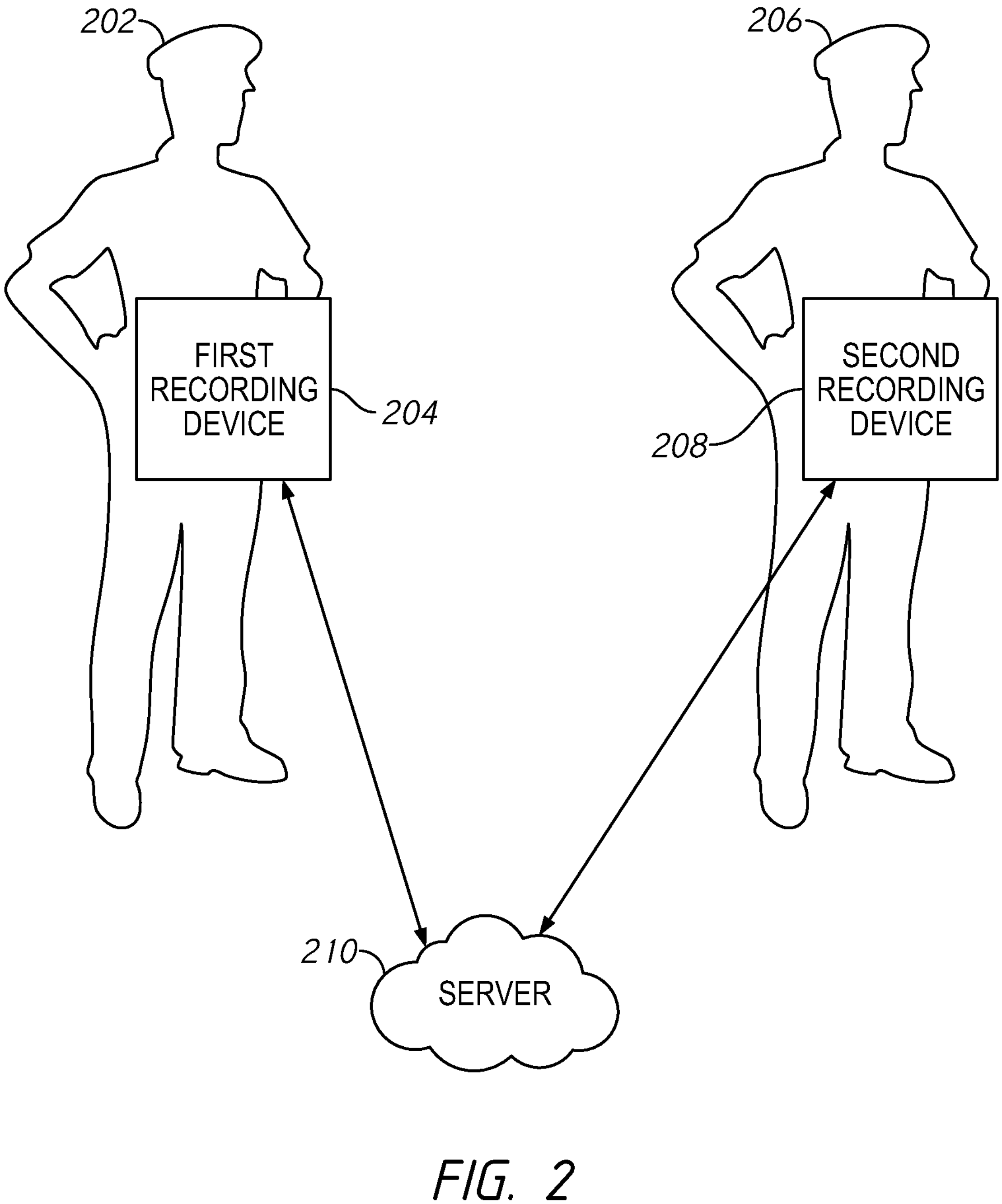
FIG. 2 is a schematic illustration of a system for the transmission of audio data between recording device(s) and a server in accordance with examples described herein.

FIG. 2 is a schematic illustration of a system for the transmission of audio data between recording device(s) and a server in accordance with examples described herein. FIG. 2 depicts a scene where a first officer 202 and a second officer 206 are present. The first officer 202 may carry a first recording device 204 and the second officer 206 may carry a second recording device 208. The first recording device 204 may obtain first audio data at an incident. The second recording device 208 may obtain second audio data at the incident during at least a portion of time the first audio data was recorded. In some examples, the first recording device 204 and second recording device 208 may be in proximity during at least portions of time that the first and/or second audio data is recorded.

The first recording device 204 and second recording device 208 may be implemented by at least one of the recording devices A, C, D, E, and H of FIG. 1. The communication links may be implemented by the communication links 134, 112, 122, 142, and 144 of FIG. 1. Although two recording devices are shown in FIG. 2, any number may be present at a scene.

In some examples, the first recording device 204 and the second recording device 208 may communicate with one another (e.g., may transmit and/or receive audio data and/or proximity signals to and/or from the other device). In some examples, the first recording device 204 and/or the second recording device 208 may communicate with another computing device (e.g., server 210). The first recording device 204 and the second recording device 208 may be in communication with a server 210 via communication links (e.g., the Internet, Wi-Fi, cellular, RF, or wired communication) during and/or after recording the audio data.

Audio data from the recording device 204 and the recording device 208 may be provided to the server 210 for transcription. In some examples, the audio data may be uploaded to the server 210 responsive to a user's command and/or request. In other examples, the audio data may be immediately transmitted to the server 210 upon recording, and/or responsive to detection events, such as detection of predetermined keywords, sounds, or at predetermined times or when the recording devices are in predetermined locations. In some examples, the audio data may be downloaded to the server 210 by connecting to the server at a time after the recordings are complete (e.g., making a wired connection to server 210 at an end of a day or shift).

In some examples, the server 210 may be remote. The first recording device 204 and second recording device 208 may not be in communication at the incident, and may not transmit audio data to the server 210 at the incident. Instead, audio data and proximity and correlation between first recording device 204 and second recording device 208 may be identified later at the server 210. In some examples, the identification may be independent of any express interaction between the recording devices at the incident. In some examples, the first recording device 204 and/or the second recording device 208 may store audio data and/or location information. The stored audio data and/or location information may be accessed by the server 210. While server 210 is shown in FIG. 2, in some examples, a server may not be used and audio data may be stored and/or processed in storage local to recording device 204 and/or recording device 208.

Accordingly, the server 210 (or another computing or recording device) may obtain the audio data recorded by both the recording device 204 and the recording device 208. The server 210 may transcribe the audio data recorded by the recording device 204 using audio data recorded by the recording device 208, or vice versa. While examples are described herein using two recording devices, any number of recording devices may be used, and audio data recorded by any number of recording devices may be used to transcribe the audio recorded by a particular recording device.

In some examples, the server 210 may determine that audio data from another recording device (e.g., recording device 208) used in transcribing data from a particular recording device (e.g., recording device 204) was recorded during a period of time that the recording devices were in proximity to one another. Proximity may refer to the devices being within a threshold distance of one another (e.g., within 10 feet, within 5 feet, within 3 feet, within 2 feet, within 1 foot, etc.). In embodiments, the threshold distance may comprise a communication range from (e.g., about, around, etc.) a first recording device in which a second recording device may receive a short-range wireless communication signal (e.g., beacon, alignment signal, etc.) from the first recording device. The server 210 may verify proximity using recorded data associated with beacon and/or alignment signals and time associated with the recording. Alternately or additionally, server 210 may verify proximity using recorded data comprising time and location information independently recorded by each separate recording device at an incident.

In examples, a recording device (e.g., recording device 204) and another recording device (e.g., recording device 208) may not be in audio communication with each other at the incident. For example, an audio signal captured by a microphone of recording device 204 may not be transmitted to the recording device 208. An audio signal captured by a microphone of recording device 208 may not be transmitted to the recording device 204. The audio signal(s) may not be transmitted during the incident. The audio signals may not be transmitting while the audio devices are recording respective audio data. Accordingly, recording device 204 and recording device 208 may capture a same audio source at an incident, but an audio signal of the same audio source may not be exchanged between the recording devices at the incident. In embodiments, a recording device (e.g., recording device 204) may be subsequently identified as proximate to another recording device (e.g., 208) without and/or independent of an audio communication signal being exchanged between the recording devices at and/or during an incident.

In examples, computing devices herein (e.g., server 210) may transcribe audio using information from any number of recording devices. The information from a particular device may be used to transcribe audio recorded by another device during a time the devices were in proximity with one another. In some examples, audio data from a first recording device may be transcribed using information obtained from a second recording device during one period of time when the first and second recording devices are in proximity. Additionally or instead, audio data from the first recording device may be transcribed using information obtained from a third recording device during another period of time when the first and third recording devices are in proximity, etc.

In addition to audio data being transmitted from the first recording device 204 and the second recording device 208, alignment beacon(s) as described above with respect to FIG. 1 may also be transmitted. The following discussion uses the second recording device 208 as an example of receiving alignment beacon(s). However, it is to be understood that the first recording device 204 may additionally or instead receive alignments beacon(s). While alignment beacons are discussed, other location information may additionally or instead be provided (e.g., GPS information, signal strength of a broadcast signal, etc.).

The second recording device 208 may receive an alignment beacon indicative of distance between the first and second recording devices 204 and 208. The second recording device 208 may be a receiving device that also records its current time as maintained by the receiving recording device. The time recorded by the receiving device may thus be related to the received alignment data. In this manner, recording devices may provide (e.g., store) an association between a time of recording audio data with a time the device is at a particular distance from one or more other devices. For example, given a time that audio data is recorded, location information may be reviewed (e.g., by server 210 and/or one of the recording devices) to determine which other recording devices were within a threshold proximity at that time.

In some examples, the first recording device 204 may be the broadcasting recording device as described with respect to FIG. 1. Even though no value of time may be transmitted by a broadcasting recording device or received by a receiving recording device, the alignment data may nonetheless relate a point in time in the audio data recorded by the broadcasting device (e.g., first recording device 204) to a point in time in the audio data recorded by the receiving device (e.g., second recording device 208). Even if the current time maintained by the broadcasting device and the receiving device is very different from each other, because the alignment data relates to a particular portion (e.g., certain time) of the audio data recorded by the transmitting device and to a particular portion of the audio data recorded by the receiving device, the audio data from the two devices are related by the alignment data and may therefore be aligned in playback and/or portions of the second audio data may be located which were recorded at a same time, or within a same time range, as portions of the first audio data. Portions of the second audio data occurring within the same time range as portions of the first audio data may be used when transcribing the first audio data. In operation, each recording device may periodically transmit an alignment beacon. A portion of the data of each alignment beacon transmitted may be different from the data of other alignment beacons transmitted by the same recording device and/or any other recording device. Data from each transmitted alignment beacon may be stored by the transmitting device along with a time that relates the alignment data to the audio data in process of being recorded by the recording device at the time of transmission or thereabout. Alignment data may be stored with or separate from the audio data that is being captured and stored (e.g., recorded) by the recording device. A recording device may transmit many beacons while recording audio at an event, for example. The audio and alignment data recorded by a recording device may be uploaded to the server 210 and/or stored and the stored data accessed by the server 210. The server 210 may receive audio and alignment data from recording device(s). In some examples, the server 210 may be referred to as an evidence manager and/or transcriber. The server 210 may search (e.g., inspect, analyze) the data from the various recording devices (e.g., first recording device 204 and second recording device 208) to determine whether the audio data recorded by one recording device relates to (e.g., was recorded during at least partly during a same time period as) the audio data recorded by one or more other recording devices. Because a recording device that transmits an alignment beacon (e.g., first recording device 204) may record the transmitted alignment data in its own memory and a recording device that receives the alignment beacon may record the same alignment data in its own memory (e.g., second recording device 208), the server 210 may detect related event data by searching for alignment data that is common to the event data from two or more devices in some examples. The server 210 may use the alignment data recorded by the respective recording devices to align the audio data from the various recording devices for aligned playback.

Alignment of audio data is not limited to alignment after upload or by post processing. During live streaming, recording devices may provide audio and alignment data. During presentation of the audio data, the alignment data may be used to delay the presentation of one or more steams of audio data to align the audio data during the presentation.

Stored alignment data is not limited in use to aligning audio data from different recording devices for playback. Alignment data may be used to identify an event, a particular operation performed by a recording device, and/or related recording devices. Alignment data may also include the serial number of the device that transmitted the alignment beacon. The alignment data from one or more recording devices may be searched to determine whether those recording devices received alignment beacons from a particular recording device. Alignment data from many recording devices may be searched to determine which recording devices received alignment beacons from each other and a possible relationship between the devices, or a relationship between the devices with respect to an event.

Recording devices may be issued, owned, or operated by a particular security agency (e.g., police force). The agency may operate and/or maintain servers that receive and record information regarding events, agency personnel, and agency equipment. An agency may operate and/or maintain a dispatch server (e.g., computer) that dispatches agency personnel to events and receives incoming information regarding events, and receives information from agency and non-agency personnel. The information from an agency server and/or a dispatch server may be used in combination with the data recorded by recording devices, including alignment data, to gain more knowledge regarding the occurrences of an event, the personnel that recorded the event, and/or the role of a recording device in recording the event.

The server 210 may be used to transcribe audio data from one recording device using audio data from another recording device. In some examples, audio from another recording device (e.g., recording device 208) may be used to assist in transcribing audio from a particular recording device (e.g., recording device 204) when the audio from the particular recording device is determined to have an audio quality below a threshold—e.g., when the audio quality is poor. Accordingly, the server 210 may analyze at least a portion of the audio data from the recording device 204 to determine a quality of the portion of the audio data. The server 210 may analyze the audio data in the temporal domain in some examples. An amplitude of the audio signal may be analyzed to determine a quality of the audio signal. The quality may be considered poor when the amplitude is less than a threshold, for example. In some examples, the server 210 may analyze the audio data of the first and/or second audio data in the frequency domain. The quality may be considered poor when audio is not present at particular frequencies or frequency ranges and/or is present relatively uniformly over a broad frequency spectrum (e.g., white noise). The server 210 may include and/or utilize a frequency filter to analyze particular frequencies of received and/or stored audio data. In some examples, audio data may be wholly and/or partially transcribed, and the audio data may be determined to be of poor quality when a confidence level associated with the transcription is below a threshold level.

Accordingly, the server 210 may transcribe audio data, in some examples audio data from one device is transcribed in part using audio data from another device. Transcription generally refers to the identification of words corresponding to audio signals. In some examples of transcription, multiple candidate words may be identified for one or more portions of the audio data. Each candidate word may be associated with a confidence score. The collection of candidate words may be referred to as a candidate transcription. Transcription of the audio data recorded by recording device 204 may be performed using some of the audio data recorded by recording device 208 in some examples.

To transcribe audio data from one recording device using audio data from another device, in some examples, the audio data from multiple devices may be wholly and/or partially combined (e.g., by server 210 or another computing device). Transcription may be performed (e.g., by server 210) on the combined audio data. The combination may occur, for example, by adding all or a portion of the audio data together (e.g., by adding portions of the data and/or portions of recorded analog audio signals). In some examples, the server 210 may wholly and/or partially transcribe both the audio data recorded by multiple devices, and may utilize portions of the transcription of audio data from one device to confirm, revise, update, and/or further transcribe the audio data from another device.

As described herein, in some examples, audio data from another device may be used to assist in transcription of portions of audio data from a particular device when (1) the audio data from the particular device is of low quality, (2) recording devices used to record the audio data were in proximity with one another during the recording of the relevant portions, and/or (3) when the combined portions are determined to correspond with one another.

In some examples, if a portion of the audio data is not of low quality, the server 210 may transcribe the portion of the audio data and/or keep transcribed text data for a final transcript (also referred to herein as a "final transcription"). Text data may be kept, or the transcribed portion of the first audio data may be used independent of whether the second audio data exists from the incident during that portion of time.

In some examples the server 210 may determine which portions of audio data received from a device (e.g., from recording device 208) were recorded while the device was proximate to another device (e.g., proximate to recording device 204). For example, the server 210 may determine if the first recording device 204 and the second recording device 208 were in proximity during the time audio data of low quality was captured (e.g. using time and location information such as GPS and/or alignment beacon(s) or related data). The server 210 may utilize audio data from the second recording device 208 to combine with the audio data from the first recording device during portions of the audio data recorded when the devices were in proximity. In some examples, transcribed words and/or candidate words from the second audio data may be used to transcribe the first audio data recorded during a time the devices were in proximity.

In some examples, the server 210 may confirm that portions of audio data recorded by multiple recording devices properly correspond with one another (e.g., were recorded during a same time period and/or contain the same speaker or other sounds). In this manner, it may be more accurate to proceed with utilizing portions of audio data recorded from one recording device to transcribe portions of audio data recorded by a different audio device. The server 210 may verify that the second audio data corresponds with the first audio data based on time and/or location (e.g., GPS) information. In some examples, the server 210 may verify the second audio data corresponds with the first audio data based on one or more of: audio domain comparison, word matching domain comparison, and/or source domain comparison. Audio domain comparison may include comparing underlying audio signals. Audio domain comparison may comprise comparing underlying one or more amplitudes of the audio signals, one or more frequencies of the audio signals, or a combination of the one or more amplitudes and one or more frequencies. The one or more frequencies may be compared in a frequency domain. The one or more amplitudes may be compared in a time domain. The audio domain comparison may further comprise comparing the amplitude(s) and/or one or more frequencies at a point in time or over a period of time. In word matching domain comparison, the server 210 may compare the candidate words for sets of transcribed words generated for the first and second audio data and determine if the sets are in agreement. In source domain comparison the server 210 may verify that words in each audio data are received from a common source based on spatialization, voice pattern, etc., and confirm detected sources are consistent between the sets of audio data. In some examples, the verification may be based on a voice channel or a respective subset of the first audio data and the second audio data isolated from each other.

In some examples, the server 210 may boost the first audio data with the second audio data, or portions thereof. The portions used to boost may, for example, be portions that were recorded by multiple recording devices during a same portions of time. A portion used to boost may be a portion recorded by one recording device that was confirmed to correspond with a portion recorded by another recording device. In some examples, the boost may be in the audio domain. For example, the server 210 may substitute a portion of the second audio data for the respective portion of the first audio data. Substituting may refer to, for example, replacing a portion of the first audio data with a corresponding portion of the second audio date (e.g., a portion which was recorded at a same time). In other examples, the server 210 may additionally or alternatively combine (e.g., merge) portions of the first and second audio data. The server 210 may merge portions of the first and second audio data by addition and/or subtraction of portions of the audio data. For example, a portion of the first audio data may be merged with a corresponding portion of the second audio data by adding the portion of the first audio data to the corresponding portion of the second audio data. In some example, only certain parts of the corresponding portion of the second audio data may be used to merge with the first audio data (e.g., parts over a particular amplitude threshold and/or parts of the second audio data having a greater amplitude than in the first audio data). In some examples, the server 210 may merge portions of the first and second audio data by subtracting a portion of the second audio data from a corresponding portion of the first audio data, or vice versa. For example, merging may include subtraction of noise (e.g., background noise). For example, background noise may be cancelled from the first or second audio data, or both. In some examples, noise may be identified by comparing corresponding portions of the first and second audio data. After substituting and/or merging, the server 210 may transcribe the newly generated (e.g., combined) audio data to generate text data. In some examples, the generated text data may be used to update the text data previously generated for the portion of first audio data.

In other examples, the boost may be in the text domain. For example, during transcription of the first audio data, the server 210 may generate a set of candidate words corresponding to the audio signal. Each word in the set may have a confidence score. A word may be selected for inclusion in the transcription when, for example, it has a highest confidence score of the candidate words. In some examples, candidate words generated based on the second audio data may be used instead of candidate words generated based on corresponding portions of the first audio data when the confidence scores for the words in the second audio data are higher.

The components in FIG. 2 are examples only. Additional, fewer, and/or different components may be used in other examples. While the example of FIG. 2 is shown and described in the context of two officers at a scene, it is to be understood that other users may additionally or instead be at the scene wearing recording devices.

Figure 3:
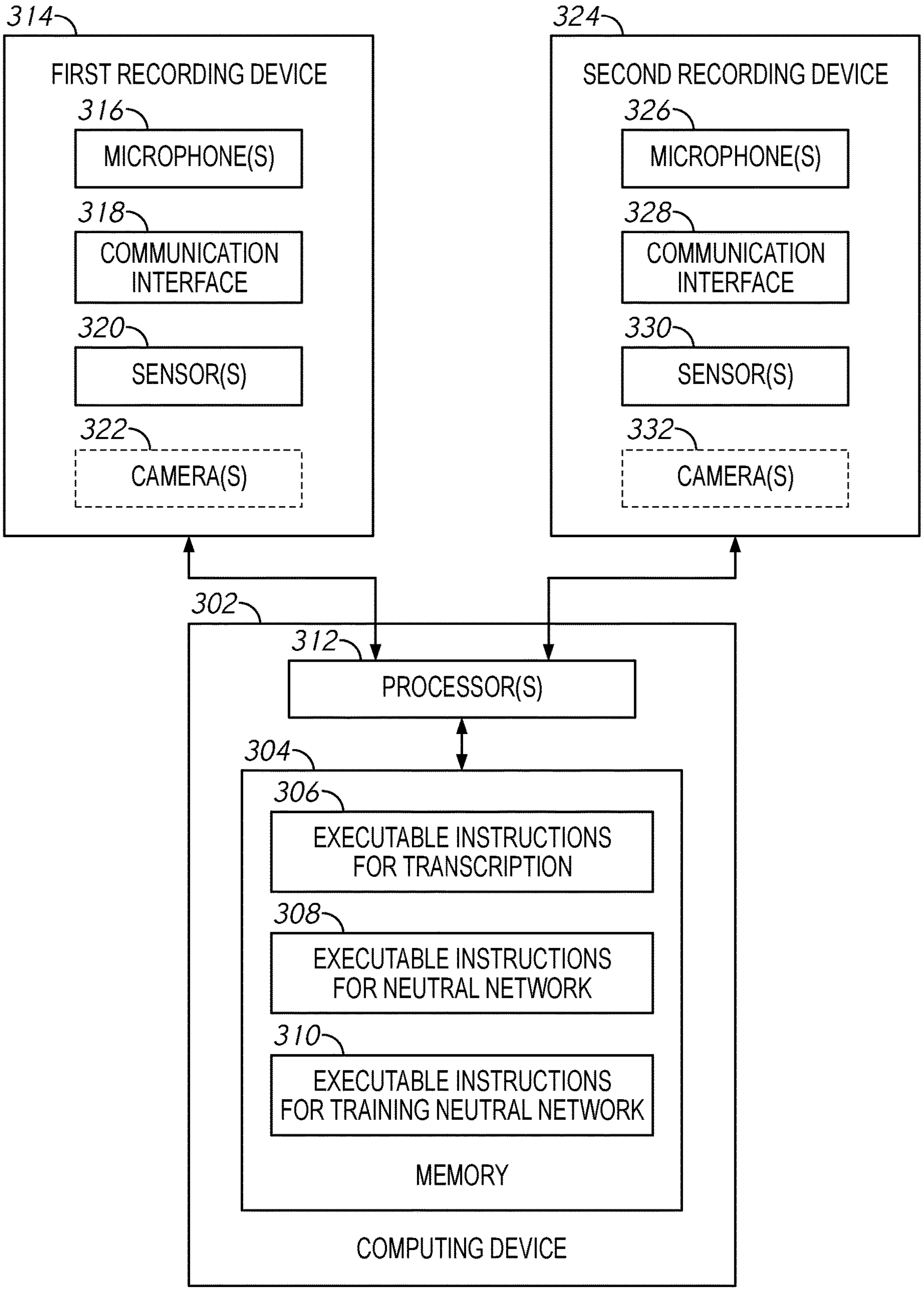
FIG. 3 is a schematic illustration of audio data processing using a computing device in accordance with examples described herein.

FIG. 3 is a schematic illustration of audio data processing using a computing device in accordance with examples described herein. The first recording device 314 and the second recording device 324 may be coupled to a computing device 302. The first recording device 314 includes microphone(s) 316 that obtains first audio signals comprising first audio data. The first recording device 314 includes communication interface 318 and sensor(s) 320. The first recording device 314 may be implemented by any recording device A, C, D, E, and H of FIG. 1 and/or the first recording device 204 of FIG. 2, for example. The second recording device 324 includes microphone(s) 316 that obtains second audio signals comprising second audio data. The second recording device 324 includes communication interface 328 and sensor(s) 330. The second recording device 324 may be implemented by any recording device A, C, D, E, and H of FIG. 1 and/or the second recording device 208 of FIG. 2, for example. The computing device 302 may be implemented by server 210 of FIG. 2 in some examples. Additional, fewer, and/or different components may be present in other examples. For example, the first recording device 314 may include one or more camera(s) 322. As another example, the second recording device 324 may include one or more camera(s) 332.

Examples of systems described herein may accordingly include computing devices. Computing device 302 is shown in FIG. 3. The computing device 302 may be implemented by the server 210 of FIG. 2 in some examples. Generally, a computing device may include one or more processors which may be used to transcribe audio data received from a recording device described herein to generate a word stream. As described herein, the computing device may use audio data received from one or more additional recording devices to perform the transcription of the audio data received from a particular recording device.

Additionally or alternatively, the computing device may also include memory be used for and/or in communication with one or more processors which may train and/or implement a neural network used to transcribe audio data and/or aid in audio transcription. A computing device may or may not have cellular phone capability, which capability may be active or inactive. Examples of techniques described herein may be implemented in some examples using other electronic devices such as, but not limited to, tablets, laptops, smart speakers, computers, wearable devices (e.g., smartwatch), appliances, or vehicles. Generally, any device having processor(s) and a memory may be used.

Computing devices described herein may include one or more processors, such as processor(s) 312 of FIG. 1. Any number or kind of processing circuitry may be used to implement processor(s) 312 such as, but not limited to, one or more central computing units (CPUs), graphical processing units (GPUs), logic circuitry, field programmable gate arrays (FPGAs), application specific integrated circuits (ASICs), controllers, or microcontrollers. While certain activities described herein may be described as performed by the processor(s) 312 it is to be understood that in some examples, the activities may wholly or partially be performed by one or more other processor(s) which may be in communication with processor(s) 312. That is, the distribution of computing resources may be quite flexible and the computing device 302 may be in communication with one or more other computing devices, continuously or intermittently, which may perform some or all of the processing operations described herein in some examples.

Computing devices described herein may include memory, such as memory 304 of FIG. 3. While memory 304 is depicted as, and may be, integral with computing device 302, in some examples, the memory 304 may be external to computing device 302 and may be in communication with processor(s) 312 and/or other processors in communication with processor(s) 312. While a single memory 304 is shown in FIG. 3, generally any number of memories may be present and/or used in examples described herein. Examples of memory which may be used include read only memory (ROM), random access memory (RAM), solid state drives, and/or SD cards.

Computing devices described herein may operate in accordance with software (e.g., executable instructions stored on one or more computer readable media, such as memory, and executed by one or more processors). Examples of software may include executable instructions for transcription 306, executable instructions for training neural network 310, and/or executable instructions for neural network 308 of FIG. 3. For example, the executable instructions for transcription 306 may provide instructions and/or settings for generating a word stream based on the audio data received from at least one of the first recording devices 314 and second recording device 324.

In an embodiment, the computing device 302 may obtain first audio data recorded at an incident with the first recording device 314, and may receive and/or derive an indication of distance between the first recording device 314 and the second recording device 324 during at least a portion of time the first audio data was recorded. The computing device 302 may further obtain second audio data recorded by the second recording device 324. The second audio data may have been recorded during at least the portion of time the indication of distance met a proximity criteria, indicating that the first recording device 314 and second recording device 324 are in proximity.

The indication of distance between first recording device 314 and the second recording device 324 may be obtained by measuring a signal strength of a signal received at the first recording device 314 from the second recording device 324. In some examples, short-range wireless radio communication (e.g., BLUETOOTH) technology may be used to evaluate the distance between the first recording device 314 and the second recording device 324. For example, short-range wireless radio communication signal strength of a signal sent between the two recording devices may correspond with a distance between the devices. The short-range wireless radio communication signal strength may correspond, for example, to one of multiple distances (e.g., 10 ft., 30 ft., or 100 ft., and other distances may be determined). In other examples, RSSI (Received Signal Strength Indicator) may also be used to determine distance between the recording devices. For example, an RSSI value may provide proximity for other recording devices. In other examples, two recording devices may be determined to be in proximity if they successfully exchange a pair of beacons (e.g., each recording device successfully receives at least one beacon from the other recording device). In examples, the signal strength may be measured by the recording device (e.g., first recording device 314 or second recording device 324) that receives the signal from another recording device.

Accordingly, the computing device 302 may utilize audio data from the second recording device 324 that was recorded while the devices were in proximity to transcribe the audio data from the first recording device 314. In some examples, the executable instructions for transcription 306 may cause the computing device 302 to verify the second audio data matches and/or corresponds with the first audio data. In some examples, a portion of audio data may be present in only one of the first set or the second set. The portion of audio data may be transcribed without reference to the other set. The executable instructions for transcription 306 may cause the computing device 302 to verify the second audio data matches the first audio data by comparing audio signals from the first audio data and the second audio data in frequency domain, amplitude, or combinations thereof. A common source between the first audio data and the second audio data may be identified based on spatialization and voice pattern during at least the portion of the time at the incident.

In some examples, the executable instructions for transcription 306 may provide instructions to generate a first set of candidate words based on the first audio data and a second set of candidate words based on the second audio data. A confidence score may be assigned for each of the candidate words in the first set and the second set. Candidate words may be evaluated and selected based on the confidence scores of the first set of candidate words and the second set of candidate words. A word stream made of the candidate words having a particular criteria (e.g., highest) overall confidence score between the first and second sets of candidate words may be generated. For example, as shown in Table-1 below, a set of candidate words may be generated for a certain portion of audio data recorded by a first recording device, and a second set of candidate words may be generated for a corresponding portion (e.g., recorded at the same time) of audio data recorded by another recording device. The sets of candidate words may be ranked with confidence scores. A variety of criteria may be specified by the executable instructions for transcription to evaluate confidence scores for candidate words in multiple sets to arrive at a selected word for the final transcription. For example, the candidate word "fog" may have the highest confidence score in the first set and the candidate word "frog" may have the highest confidence score in the second set. A word stream may select the candidate word "frog" for the final transcription because it has a higher overall confidence score than the candidate word "fog." In some examples, the overall confidence score may be assigned by combining confidence scores for each of the corresponding words in the first and second sets of candidate words. For example, the confidence scores for frog in the first and second sets may be combined, providing a high overall confidence score. In other examples, one set may be weighted more than the other set in determining the highest overall confidence score (e.g., the set based on an underlying audio signal having a higher quality, such as amplitude, may be weighted more than a set based on a lower quality recording).

TABLE 1

| First set of candidate words | Second set of candidate words |
|---|---|
| Fog | frog |
| Frog | dog |
| Dog | log |

In other examples, the executable instructions for transcription 306 may cause the computing device 302 to compare an amplitude associated with a portion of the first audio data or the second audio data with a threshold amplitude. If the amplitude of the portion is lower than the threshold amplitude, the computing device 302 may transcribe the first audio data using a corresponding portion of the second audio data.

In another embodiment, the computing device 302 may receive the first audio data from the first recording device 314 at an incident and the second audio data from the second recording device 324. The second recording devices 324 may be within a threshold distance of the first recording device 314. The executable instructions for transcription 306 may cause the computing device 302 to combine information from the first audio data with information from the second audio data. In embodiments, the information may comprise respective audio signals from the first audio data and the second audio data. The information from the first audio data may be combined with the information from the second audio data to create a combined audio data. The combined audio data may comprise combined (e.g., a combination of) audio signals from the first audio data and the second audio data. The executable instructions for transcription 306 may further instruct the computing device 302 to transcribe the combined audio data to provide a transcription of the incident.

In some examples, the executable instructions for transcription 306 may cause the computing device 302 to detect a quality of the portion of the first audio data. The quality of the portion of the audio data may comprise a quality of information from the first audio data. In embodiments, the information from the first audio may comprise an audio signal from the first audio data or one or more candidate words transcribed from the first audio data. The quality of the portion of the audio data may be detected based at least in part on a confidence score, a comparison between a received amplitude and an amplitude threshold, a frequency filter, or combinations thereof. If it is determined that the quality of the portion of the first audio data does not meet a quality threshold, the corresponding portion of second audio data of better quality may be combined with the portion of the first audio data.

In some examples, combining the portion of the first audio data with the corresponding portion of the second audio data may comprise boosting the portion of the first audio data. In some examples, boosting the portion of the first audio data with the corresponding portion in the second audio data may include substituting the portion of the first audio data with the corresponding portion in the second audio data, merging (e.g. combining) the portion of the first audio data and the corresponding portion in the second audio data, or canceling background noise in the portion of the audio signal in the first audio data based on the corresponding portion of the audio signal in the second audio data.

In some examples, the executable instructions for transcription 306 may cause the computing device 302 to verify the second audio data matches the first audio data. The second audio data may be verified to match the second audio data prior to combining the portion of the first audio data with the corresponding portion of the second audio data. For example, verifying the second audio data matches the first audio data may comprise verifying an audio signal of a portion of the first audio data matches an audio signal of a corresponding portion of the second audio data. Additionally or instead, verifying the second audio data matches the first audio data may comprise verifying at least one candidate word of a portion of the first audio data matches a candidate word of a corresponding portion of the second audio data. Accordingly, the second audio data may be verified to match the first audio data before and/or after each of the first audio data and the second audio data are transcribed, thereby ensuring that the first audio data and second audio capture a same source (e.g., audio source) and preventing one or more operations from being performed by computing device 302 when the second data does not match.

Accordingly, examples of executable instructions for transcription 306 may transcribe audio data from one recording device using portions recorded from another recording device. Those portions may be identified by matching portions of the audio data, by identifying portions recorded when the recording devices were within a certain proximity of one another, and/or when the audio quality of the first audio data is determined to be low quality. The audio data of the second recording device may be used to boost the audio signal recorded at the first device, and/or may be used to influence a selection of words for the transcription based on confidence scores.

In some examples, a machine learning algorithm may be used to transcribe audio data from a scene using audio data from multiple recording devices. The machine learning algorithm may be trained to make an advantageous combination of the audio data (e.g., the audio signals and/or selecting final words from lists of candidate words in multiple data streams). Features used to train the machine learning algorithm and/or determine the behavior of the machine learning algorithm may include proximity between devices, confidence scores of candidate words, type of devices, and/or audio quality. In embodiments, the machine learning algorithm may comprise a neural network 308. The executable instructions for neural network 308 may include instructions and/or settings for using a neural network to combine audio data recorded from multiple recording devices to generate a final transcript of the incident. The computing device 302 may employ one or more machine learning algorithms (e.g. linear regression, support-vector machine, principal component analysis, linear discriminant analysis, probabilistic liner discriminant analysis) in addition to, or as an alternative to neural network 308. Accordingly, one or more machine learning algorithms may be used herein to combine audio data from multiple sources to produce a final transcript.

Generally, a neural network refers to a collection of computational nodes which may be provided in layers. Each node may be connected at an input to a number of nodes from a previous layer and at an output to a number of nodes of a next layer. Generally, the output of each node may be a non-linear function of a combination (e.g., a sum) of its inputs. Generally, the coefficients used to conduct the non-linear function (e.g., to implement a weighted combination) may be referred to as weights. The weights may in some examples be an output of a neural network training process.

The executable instructions for training neural network 310 may include instructions and/or settings for training the neural network. A variety of training techniques may be used—including supervised and/or unsupervised learning. Training may occur by adjusting neural network parameters across a known set of “ground truth” data—spanning data received at various parameters e.g., recording device distances, audio data qualities, word confidence scores, and/or device types, and a known transcript of the incident. The neural network parameters may be varied to minimize a difference between transcripts generated by the neural network and the known transcripts. In some examples, a same computing device may be used to train the neural network (e.g., may implement executable instructions for training neural network 310) as used to operate the neural network and generate a transcription. In other examples, a different computing device may be used to train the neural network and output of the training process (e.g., weights, connections, and/or other neural network specifics) may be communicated to and/or stored in a location accessible to the computing device used to transcribe audio data.

Final transcripts generated in accordance with techniques described herein (e.g., in accordance with executable instructions for transcription 306 and/or executable instructions for neural network 308) may be used in a variety of ways. A final transcript corresponding to a transcript of audio at an incident may be stored (e.g., in memory 304 of FIG. 3). The final transcript may be displayed (e.g., on a display in communication with the computing device of FIG. 3). The final transcript may be communicated back to one or more recording devices in some examples and/or to one or more other devices at the scene or at another location for playback of the transcript. The final transcript may be logically associated with (e.g., linked, stored in a same file with, etc.) video data captured by the first recording device 314. Computing device 302 may be configured to perform operations comprising playing back video data recorded by first recording device 314, wherein the final transcript is concurrently displayed with the video data. The playback of the video data may be performed independent of any video data recorded by second recording device 324, such that information from second recording device 314 may improve accuracy of a review of audiovisual data comprising the final transcript, despite (e.g., without, independent of) the video data that may also be captured by second recording device 324. Any of a variety of data analysis may be conducted on the transcript (e.g., word searches). The final transcript may accelerate the review and transcription of evidence for agencies.

Figure 4:
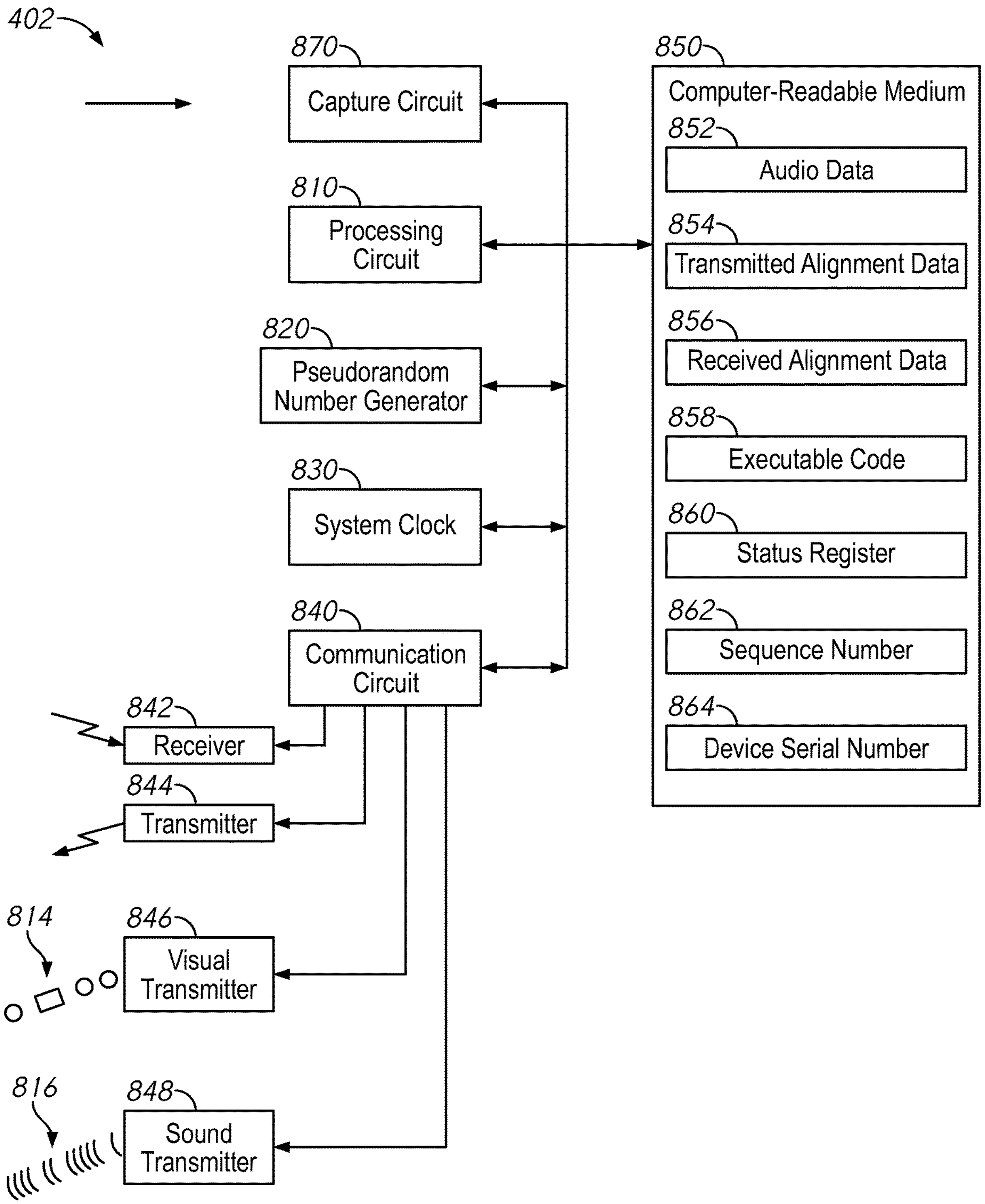
FIG. 4 is a block diagram of an example recording device arranged in accordance with examples described herein.

FIG. 4 is a block diagram of an example recording device arranged in accordance with examples described herein.

Recording device 402 of FIG. 4 may be used to implement recording device A, C, D, E, H of FIG. 1, first recording device 204 and/or second recording device 208 of FIG. 2, the first recording device 314 and/or the second recording device 324 of FIG. 3. Recording device 402 may perform the functions of a recording device discussed above. Recording device 402 includes processing circuit 810, pseudorandom number generator 820, system clock 830, communication circuit 840, receiver 842, transmitter 844, visual transmitter 846, sound transmitter 848, and computer-readable medium 850. Computer-readable medium 850 may store data such as audio data 852, transmitted alignment data 854, received alignment data 856, executable code 858, status register 860, sequence number 862, and device serial number 864. Transmitted alignment data 854 and received alignment data 856 may include alignment data as discussed with respect to alignment data or beacons. Status register 860 may store status information for recording device 402.

The value of sequence number 862 may be determined by processing circuit 810 and/or a counter. If the value of sequence number 862 is determined by a counter, processing circuit 810 may control the counter in whole or in part to increment the value of the sequence number at the appropriate time. The present value of sequence number 862 is stored as a sequence number upon generation of respective alignment data, and as stored as a different sequence number in other data of the various stored alignment data.

Device serial number 864 may be a serial number that cannot be altered.

A processor circuit may include any circuitry and/or electrical/electronic subsystem for performing a function. A processor circuit may include circuitry that performs (e.g., executes) a stored program (e.g., executable code 858). A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic, gyroscopes). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus. A bus may operate as a serial bus and/or a parallel bus.

Processing circuit 810 may perform all or some of the functions of pseudorandom number generator 820. In the event that processing circuit 810 performs all of the functions of pseudorandom number generator 820, the block identified as pseudorandom number generator 820 may be omitted due to incorporation into processing circuit 810.

Processing circuit 810 may perform all or some of the functions of system clock 830. System clock 830 may include a real-time clock. In the event that processing circuit 810 performs all of the functions of system clock 830, the block identified as system clock 830 may be omitted due to incorporation into processing circuit 810. Clock 830 may be a crystal that provides a signal to processing circuit 810 for maintaining time.

Processing circuit 810 may track the state of operation, as discussed above, and update status register 860 as needed. Processing circuit 810 may cooperate with pseudorandom number generator 820 to generate a pseudorandom number for use as a status identifier such as status identifier 414 as discussed above.

Processing circuit 810 may perform all or some of the functions of communication circuit 840. Processing circuit 810 may form alignment data for transmission and/or storage. Processing circuit 810 may cooperate with communication circuit 840 to form alignment beacons to transmit alignment data. Processing circuit 810 may cooperate with communication circuit 840 to receive alignment beacons, extract, and store received alignment data.

Processing circuit 810 may cooperate with computer-readable medium 850 to read, write, format, and modify data stored by computer-readable medium 850.

A communication circuit may transmit and/or receive information (e.g., data). A communication circuit may transmit and/or receive (e.g., communicate) information via a wireless link and/or a wired link. A communication circuit may communicate using wireless (e.g., radio, light, sound, vibrations) and/or wired (e.g., electrical, optical) mediums. A communication circuit may communicate using any wireless (e.g., BLUETOOTH, ZIGBEE, WAP, WiFi, NFC, IrDA, GSM, GPRS, 3G, 4G) and/or wired (e.g., USB, RS-232, Firewire, Ethernet) communication protocols. Short-range wireless communication (e.g. BLUETOOTH, ZIGBEE, NFC, IrDA) may have a limited transmission range of approximately 20 cm-100 m. Long-range wireless communication (e.g. GSM, GPRS, 3G, 4G, LTE) may have a transmission ranges up to 15 km. A communication circuit may receive information from a processing circuit for transmission. A communication circuit may provide received information to a processing circuit.

A communication circuit may arrange data for transmission. A communication circuit may create a packet of information in accordance with any conventional communication protocol for transmit. A communication circuit may disassemble (e.g., unpack) a packet of information in accordance with any conventional communication protocol after receipt of the packet.

A communication circuit may include a transmitter (e.g., 844, 846, 848) and a receiver (e.g., 842). A communication circuit may further include a decoder and/or an encoder for encoding and decoding information in accordance with a communication protocol. A communication circuit may further include a processing circuit for coordinating the operation of the transmitter and/or receiver or for performing the functions of encoding and/or decoding.

A communication circuit may provide data that has been prepared for transmission to a transmitter for transmission in accordance with any conventional communication protocol. A communication circuit may receive data from a receiver. A receiver may receive data in accordance with any conventional communication protocol.

A visual transmitter transmits data via an optical medium. A visual transmitter uses light to transmit data. The data may be encoded for transmission using light. Visual transmitter 846 may include any type of light source to transmit light 814. A light source may include an LED. A communication circuit and/or a processing circuit may control in whole or part the operations of a visual transmitter.

Visual transmitter 846 performs the functions of a visual transmitter as discussed above.

A sound transmitter transmits data via a medium that carries sound waves. A sound transmitter uses sound to transmit data. The data may be encoded for transmission using sound. Sound transmitter 848 may include any type of sound generator to transmit sound 816. A sound generator may include any type of speaker. Sound may be in a range that is audible to humans or outside of the range that is audible to humans. A communication circuit and/or a processing circuit may control in whole or part the operations of a sound transmitter.

Sound transmitter 848 performs the functions of a sound transmitter as discussed above.

A capture circuit captures data related to an event. A capture circuit detects (e.g., measures, witnesses, discovers, determines) a physical property. A physical property may include momentum, capacitance, electric charge, electric impedance, electric potential, frequency, luminance, luminescence, magnetic field, magnetic flux, mass, pressure, spin, stiffness, temperature, tension, velocity, momentum, sound, and heat. A capture circuit may detect a quantity, a magnitude, and/or a change in a physical property. A capture circuit may detect a physical property and/or a change in a physical property directly and/or indirectly. A capture circuit may detect a physical property and/or a change in a physical property of an object. A capture circuit may detect a physical quantity (e.g., extensive, intensive). A capture circuit may detect a change in a physical quantity directly and/or indirectly. A capture circuit may detect one or more physical properties and/or physical quantities at the same time (e.g., in parallel), at least partially at the same time, or serially. A capture circuit may deduce (e.g., infer, determine, calculate) information related to a physical property. A physical quantity may include an amount of time, an elapse of time, a presence of light, an absence of light, a sound, an electric current, an amount of electrical charge, a current density, an amount of capacitance, an amount of resistance, and a flux density.

A capture circuit may transform a detected physical property to another physical property. A capture circuit may transform (e.g., mathematical transformation) a detected physical quantity. A capture circuit may relate a detected physical property and/or physical quantity to another physical property and/or physical quantity. A capture circuit may detect one physical property and/or physical quantity and deduce another physical property and/or physical quantity.

A capture circuit may include and/or cooperate with a processing circuit for detecting, transforming, relating, and deducing physical properties and/or physical quantities. A processing circuit may include any conventional circuit for detecting, transforming, relating, and deducing physical properties and/or physical quantities. For example, a processing circuit may include a voltage sensor, a current sensor, a charge sensor, and/or an electromagnetic signal sensor. A processing circuit may include a processor and/or a signal processor for calculating, relating, and/or deducing.

A capture circuit may provide information (e.g., data). A capture circuit may provide information regarding a physical property and/or a change in a physical property. A capture circuit may provide information regarding a physical quantity and/or a change in a physical quantity. A capture circuit may provide information in a form that may be used by a processing circuit. A capture circuit may provide information regarding physical properties and/or quantities as digital data.

Data provided by a capture circuit may be stored in computer-readable medium 850 thereby performing the functions of a recording device, so that capture circuit 870 and computer-readable medium 850 cooperate to perform the functions of a recording device.

Capture circuit 870 may perform the functions of a capture circuit discussed above.

A pseudorandom number generator generates a sequence of numbers whose properties approximate the properties of a sequence of random numbers. A pseudorandom number generator may be implemented as an algorithm executed by a processing circuit to generate the sequence of numbers. A pseudorandom number generator may include any circuit or structure for producing a series of numbers whose properties approximate the properties of a sequence of random numbers.

An algorithm for producing the sequence of pseudorandom numbers includes a linear congruential generator algorithm and a deterministic random bit generator algorithm.

A pseudorandom number generator may produce a series of digits in any base that may be used for a pseudorandom number of any length (e.g., 64-bit).

Pseudorandom number generator 820 may perform the functions of a pseudorandom number generator discussed above.

A system clock provides a signal from which a time or a lapse of time may be measured. A system clock may provide a waveform for measuring time. A system clock may enable a processing circuit to detect, track, measure, and/or mark time. A system clock may provide information for maintaining a count of time or for a processing circuit to maintain a count of time.

A processing circuit may use the signal from a system clock to track time such as the recording of event data. A processing circuit may cooperate with a system clock to track and record time related to alignment data, the transmission of alignment data, the reception of alignment data, and the storage of alignment data.

A processing circuit may cooperate with a system clock to maintain a current time (e.g., day, date, time of day) and detect a lapse of time. A processing circuit may cooperate with a system clock to measure the time of duration of an event.

A system clock may work independently of any system clock and/or processing device of any other recording device. A system clock of one recording device may lose or gain time with respect to the current time maintained by another recording device, so that the present time maintained by one device does not match the present time as maintained by another recording device. A system clock may include a real-time clock.

System clock 830 may perform the functions of a system clock discussed above.

A computer-readable medium may store, retrieve, and/or organize data. As used herein, the term "computer-readable medium" includes any storage medium that is readable and/or writeable by an electronic machine (e.g., computer, computing device, processor, processing circuit, transceiver). Storage medium includes any devices, materials, and/or structures used to place, keep, and retrieve data (e.g., information). A storage medium may be volatile or non-volatile. A storage medium may include any semiconductor medium (e.g., RAM, ROM, EPROM, Flash), magnetic medium (e.g., hard disk drive), medium optical technology (e.g., CD, DVD), or combination thereof. Computer-readable medium includes storage medium that is removable or non-removable from a system. Computer-readable medium may store any type of information, organized in any manner, and usable for any purpose such as computer readable instructions, data structures, program modules, or other data. A data store may be implemented using any conventional memory, such as ROM, RAM, Flash, or EPROM. A data store may be implemented using a hard drive.

Computer-readable medium may store data and/or program modules that are immediately accessible to and/or are currently being operated on by a processing circuit.

Computer-readable medium 850 stores audio data as discussed above. Audio data 852 represents the audio data stored by computer-readable medium 850. Computer-readable medium 850 stores transmitted alignment data. Transmitted alignment data 854 represents the transmitted alignment data stored by computer-readable medium 850. Computer-readable medium 850 stores received alignment data. Received alignment data 856 represents the received alignment data stored by computer-readable medium 850.

Computer-readable medium 850 stores executable code 858. Executable code may be read and executed by any processing circuit of recording device 402 to perform a function. Processing circuit 801 may perform one or more functions of recording device 402 by execution of executable code 858. Executable code 858 may be updated from time to time.

Computer-readable medium 850 stores a value that represents the state of operation (e.g., status) of recording device 402 as discussed above.

Computer-readable medium 850 stores a value that represents the sequence number of recording device 402 as discussed above.

Computer-readable medium 850 stores a value that represents the serial number of recording device 402 as discussed above.

A communication circuit may cooperate with computer-readable medium 850 and processing circuit 810 to store data in computer-readable medium 850. A communication circuit may cooperate with computer-readable medium 850 and processing circuit 810 to retrieve data from computer-readable medium 850. Data retrieved from computer-readable medium 850 may be used for any purpose. Data retrieved from computer-readable medium 850 may be transmitted by communication circuit to another device, such as another recording device and/or a server.

Computer-readable medium 850 may perform the functions of a computer-readable medium discussed above.

Figure 5:
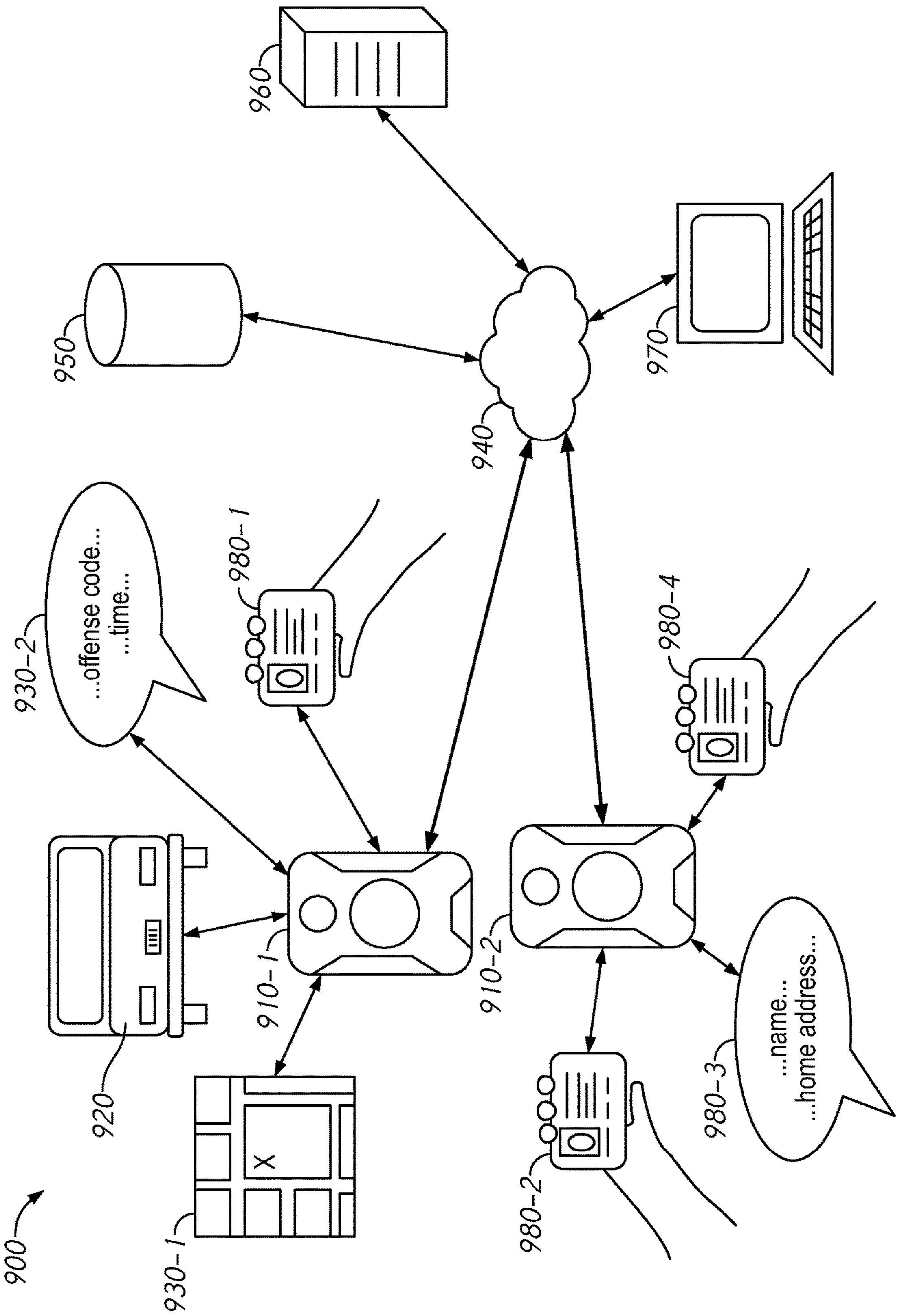
FIG. 5 illustrates a system and example of recording information in accordance with examples described herein.

FIG. 5 illustrates an example embodiment of recording information in accordance with examples described herein. In FIG. 5, an event 900 at a location has occurred. In embodiments, event 900 may comprise a portion of event 100 with brief reference to FIG. 1. Event 900 may involve recording devices 910 (e.g., which may be implemented using recording devices A, C, D, E, H of FIG. 1, first and second recording devices 204 and 208 of FIG. 2, first recording device 314 and/or second recording device 324 of FIG. 3), vehicle 920, incident or event information 930, and one or more persons 980. Recorded data for the event 900 may be further transmitted by recording devices 910 to one or more servers 960 (e.g., which may be implemented using server 210 of FIG. 2 and computing device 302 of FIG. 3) and/or data stores 950 via network 940. Recorded data may alternately or additionally be transferred to one or more computing devices 970. One or more data stores 950, servers 960, and/or computing devices may further process the recorded data for event 900 to generate report data included in a report provided to one or more computing devices 970.

Event 900 may include a burglary of vehicle 920 to which at least two responders respond with recording devices 910. The recording devices 910 may capture event data including data indicative of offense information 930, vehicle 920, and persons 980 associated with the event 900. The recording devices 910 may record audio from the event including words spoken by the responders, by one or more suspects, by one or more bystanders, and/or other noises in the environment.

Recording devices 910 may include one or more wearable (e.g., body-worn) cameras, wearable microphones, one or more cameras and/or microphones mounted in vehicles, and mobile computing devices.

For event 900, recording device 910-1 is a wearable camera which may capture first audio data. Recording device 910-1 may be associated with a first responder. The first responder may be a first law enforcement officer. Recording device 910-1 may capture first event data comprising first video data and first audio data. The first event data may also comprise other sensor data, such as data from a position sensor and beacon data from a proximity sensor of the recording device 910-1. Recording device 910-1 may capture the first event data throughout a time of occurrence of event 900, without or independent of any manual operation by the first responder, thereby allowing the first responder to focus on gathering information and activity at event 900.

In embodiments, event data captured by recording device 910-1 may include information corresponding to one or more of offense information 930, vehicle 920, and first person 980-1. First offense information 930-1 may include a location of the recording device 910-1 captured by a position sensor of the recording device 910-1. Second offense information 930-2 may include an offense type or code captured in audio data from a microphone of recording device 910-1. Information corresponding to first person 980-1 may be recorded in video and/or audio data captured by first recording device 910-1. In embodiments, first person 980-1 may be a suspect of an offense at event 900. The suspect may make utterances recorded by the first recording device 910-1. In embodiments, first event data captured by recording device 910-1 may further include proximity data indicative of one or more signals received from recording device 910-2, indicative of the proximity of recording device 910-2.

In embodiments, recording device 910-2 comprises a second wearable camera. Recording device 910-2 may capture second event data. Recording device 910-2 may be associated with a second responder. The second responder may be a second law enforcement officer. Recording device 910-2 may capture a second event data comprising second video data and second audio data. The second event data may also comprise other sensor data, such as data from a position sensor and beacon data from a proximity sensor of the recording device 910-2. Recording device 910-1 may capture the second event data throughout a time of occurrence of event 900, without or independent of any manual operation by the second responder, thereby allowing the second responder to focus on gathering information and activity at event 900.

In embodiments, second event data captured by recording device 910-2 may include information corresponding to one or more a second person 980-2, a third person 980-3, and a fourth person 980-4 at event 900. Information corresponding to each of second person 980-2 and fourth person 980-4 may be recorded in video and/or audio data captured by second recording device 910-2. For example, second person 980-2 and fourth person 980-4 may each make statements in the vicinity of the second recording device 910-2. Information corresponding to third person 980-3 may be recorded in audio data captured by second recording device 910-2. For example, third person 980-3 may state their name, home address, and date of birth while speaking to the second responder at event 900. In embodiments, second person 980-2, third person 980-3, and fourth person 980-4 may be witnesses of an offense at event 900. In embodiments, second event data captured by recording device 910-2 may further include proximity data indicative of one or more signals received from recording device 910-1, indicative of the proximity of recording device 910-1 to recording device 910-2 at event 900. The recording devices 910-1 and 910-2 may be sufficiently proximate that some audio may be captured by both devices. For example, the statements made in the vicinity of the second recording device 910-2 may also be recorded to some degree by the first recording device 910-1. The suspect's utterances, primarily captured by the recording device 910-1, may also be captured to some degree by the recording device 910-2. At any given time, the recording device having the highest quality audio of a particular speaker may vary. For example, the suspect may be closer to the first recording device 910-1, and a recording from the first recording device 910-1 may nominally have a higher quality audio of the suspect. However, during a portion of the suspect's utterances, the responder wearing the first recording device 910-1 may move in a manner which harms the audio quality—e.g., the responder may turn their back to the suspect, and/or move behind a vehicle or other obstruction, obscuring the audio. During those times, it may be that the suspect's utterances may be better transcribed from another recording device at the scene (e.g., the recording device 910-2) in accordance with techniques described herein.

In embodiments, recording devices 910-1, 910-2 may be configured to transmit first and second event data (e.g., audio data) to one or more servers 960 and/or data stores 950 for further processing. The event data may be transmitted via network 940, which may include one or more of each of a wireless network and/or a wired network. The sets of unstructured data may be transmitted to one or more data stores 950 for processing including short-term or long-term storage. The event data may be transmitted to one or more servers 960 for processing including generating a transcription associated with the event data as described herein. The event data may be transmitted to one or more computing devices 970 for processing including playback prior to and/or during generation of a report. In embodiments, the event data may be transmitted prior to conclusion of event 900. The event may be transmitted in an ongoing manner (e.g., streamed, live streamed, etc.) to enable processing by another device while event 900 is occurring. Such transmission may enable transcription data to be available for import prior to conclusion of event 900 and/or immediately upon conclusion of event 900, thereby decreasing a time required for a responder and computing devices associated with a responder to be assigned or otherwise occupied with a given event.

In embodiments, event data may be selectively transmitted from one or more recording devices prior to completion of recording of the event data. An input may be received at the recording device to indicate whether the event data should be transmitted to a remote server for processing. For example, a keyword may indicate that audio data should be immediately transmitted (e.g., uploaded, streamed, etc.) to a server. The immediate transmission may ensure or enable certain portions of event data to be available at or prior to an end of an event. In embodiments, event data relating to a narrative portion of a structured report (e.g., text data indicating responder's recollection of event) may be immediately transmitted to a server for detection of text data corresponding to the narrative.

In embodiments, transcription data generated by one or more servers 960 may be transmitted to another computing device upon being generated. The transcription data may be transmitted by one or more of network 940 or an internal bus with another computing device, such as an internal bus with one or more data stores 950. The transcription data may be transmitted to one or more data stores 950 and/or computing devices 970. In embodiments, the transcription data may also be transferred to one or more recording devices 910.

In embodiments, transcription data may be received for review and subsequent import into a report. The transcription data may be received by one or more computing devices 970. The transcription data may be received via one or more of network 940 and an internal bus. Computing devices 970 receiving the transcription data may include one or more of a computing device, camera, a mobile computing device, and a mobile data terminal (MDT) in a vehicle (e.g., vehicle 130 with brief reference to FIG. 1).

In embodiments according to various aspects of the present disclosure, systems, methods, and devices are provided for transcribing a portion of audio data. The embodiments may use information from a portion of other audio data (e.g., second audio data) recorded at a same incident as the portion of audio data. In some embodiments, the information from the portion of the other audio data may be applied to the portion of the audio data prior to transcribing the audio data and/or the other audio data. In these examples, the information may comprise an audio signal from the other audio data. Transcribing the first audio data using the information may comprise combining an audio signal from the audio data with the audio signal from the other audio data. In some embodiments, the other audio data may be transcribed before the information from the portion of the other data is used to improve the transcription of the portion of the audio data. In these examples, the information may comprise transcribed information (e.g., transcription, word stream, one or more candidate words, confidence scores, etc.) generated from the other audio data. Transcribing the first audio data using the information may comprise combining transcribed information from the audio data with the transcribed information from the other audio data. Some embodiments may further comprise one or more of receiving the audio data, identifying the second data relative to the first audio data as having been recorded at a same incident as the audio data. Example embodiments according to various aspects of the present disclosure are further disclosed with regards to FIG. 6 and FIG. 7.

Figure 6:
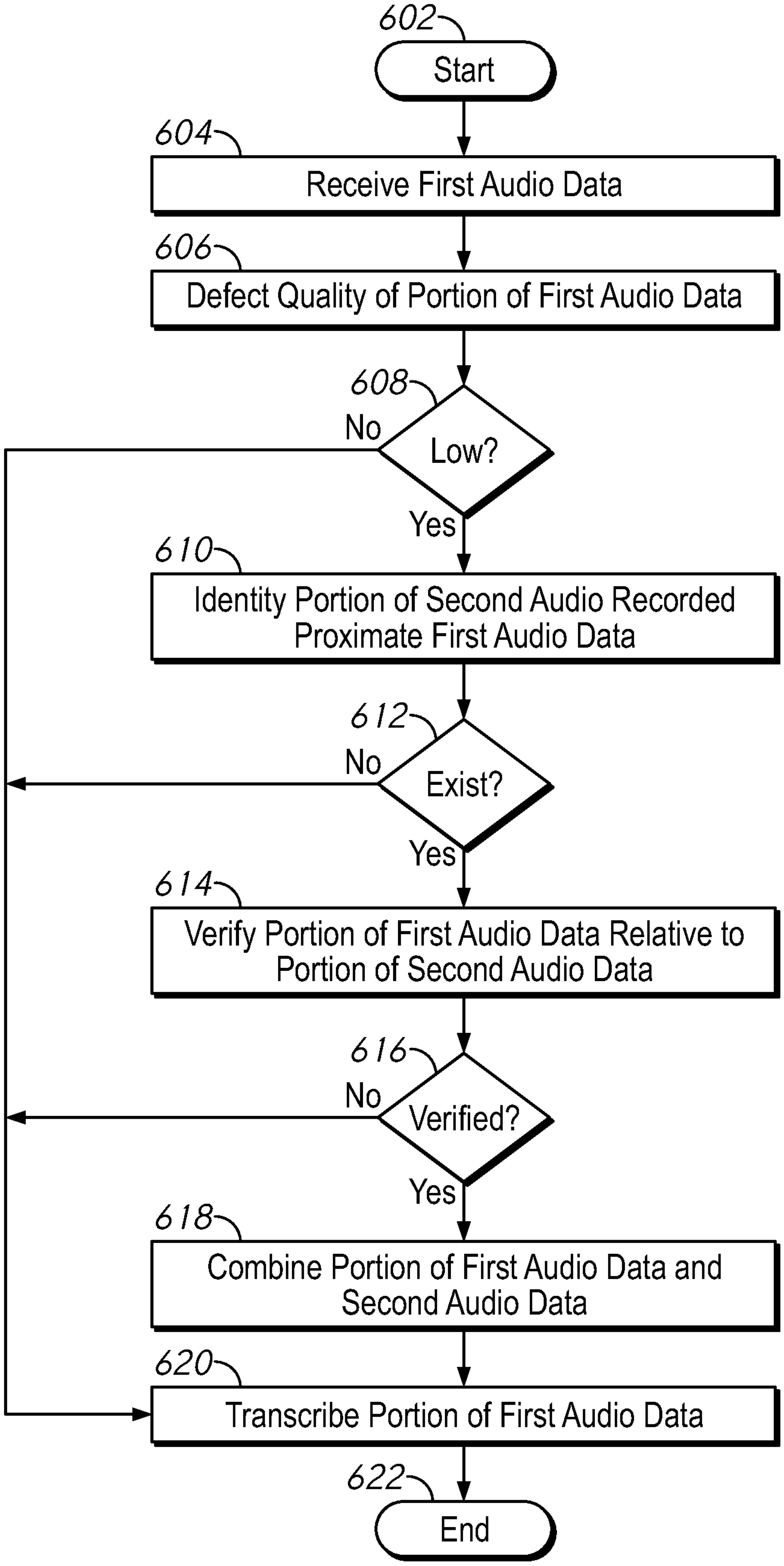
FIG. 6 depicts an example method of transcribing a portion of audio data, in accordance with examples described herein.

FIG. 6 depicts a method of transcribing a portion of audio data, in accordance with an embodiment of the present invention. The method shown in FIG. 6 may be performed by one or more computing devices described herein. The one or more computing devices may comprise a server and/or a computing device. For example, the method shown in FIG. 6 may be performed by the server 210 of FIG. 2 and/or the computing device 302 of FIG. 3, in some examples in accordance with the executable instructions for transcription 306.

In operation 602, the method of transcribing a portion of audio data starts. In some examples, the method may start at the server 210 of FIG. 2 or the computing device 302 of FIG. 3. In other examples, the processing circuit 810 of FIG. 4 may provide commands (e.g., instructions) to one or more other components for the component to start the operation.

In operation 604, the server and/or the computing device may receive audio data representative of the scene. The audio data may comprise first audio data. The audio data may be received from a recording device. The recording device may capture the audio data at the scene. The recording device may be separate from the server and/or the computing device. The recording device may be remotely located from each of the server and/or the computing device. The recording device may be in communication with the server and/or the computing device via a wired and/or wireless communication network. The server and/or computing device may comprise a remote computing device relative to the scene and/or the recording device. In some examples, the recording device may be implemented by any of the recording devices A, C, D, E, and H shown in FIG. 1, the first recording device 204 or second recording device 208 of FIG. 2, and/or the first recording device 314 or second recording device 324 of FIG. 3. In operation 604, the recording device may transmit the audio data to a server and/or computing device for analysis and processing. In some examples, the server and/or computing device may be implemented by the server 210 shown in FIG. 2 and/or the computing device 302 shown in FIG. 3. The audio data may be transmitted to the server and/or computing device as described above with respect to FIGS. 2 and 3.

In operation 606, which is optional in some examples, the server and/or computing device detects (e.g., determines) quality of at least a portion of the audio data. To determine quality, the server 210 or computing device 302 may analyze the portion of audio data in the temporal domain. For example, an amplitude of the audio signal may be analyzed to determine a quality of the audio signal. If the amplitude is below a predetermined threshold, the audio signal may be determined to be of poor quality. In some examples, the computing device may determine the audio data has poor quality when the amplitude at a particular frequency is below a predetermined threshold for a predetermined amount of time. In some examples, the server 210 and/or the computing device 302 may analyze the audio data of the first audio data in the frequency domain. The presence and/or absence of audio data at particular frequencies or smoothed generally across frequencies (e.g., white noise) may cause the computing device to determine the audio data is of poor quality. Accordingly, the server 210 and/or the computing device 302 may analyze the audio data using a frequency filter. Accordingly, one or more frequencies and/or amplitudes of the audio signal may be used to determine quality of the audio signal. The quality may be determined based on a comparison of amplitude against a threshold amplitude. For example, audio signals having an amplitude lower than the threshold may be determined to be of low quality.

In operation 608, if the quality is determined to be of low quality, the server 210 and/or computing device 302 may further process the audio data in operation 610. If the quality is not determined to be of low quality, then the audio data may be transcribed by the server 210 and/or computing device 302 at operation 620. Note that operation 608 is optional, such that a quality determination does not always precede use of another recording device's audio data to transcribe a particular recording device's audio data, however in some examples a low quality determination in operation 608 may form all or part of a decision to utilize other audio data during transcription.

In various embodiments according to aspects of the present disclosure, and as noted above, detecting a quality of audio data may be optional. For example, operations 606 and 608 may not be performed and/or other operations of a method of transcribing a portion of audio data may be performed independent of a quality of the audio data. Operations 606 and 608 may be excluded (e.g., not included, not performed, etc.) according to various aspects of the present disclosure. Such embodiments may enable a transcript of each received audio data to be improved using information from other audio data, regardless of the quality of the received audio data.

In operation 610, the server 210 and/or computing device 302 may identify a portion of a second audio recorded proximate the portion of the first audio data. The second audio may have been recorded by a second recording device at the scene when the first audio data was acquired by the first recording device. The second recording device may be implemented by any of the recording devices A, C, D, E, and H shown in FIG. 1, the first recording device 204 or second recording device 208 of FIG. 2, and/or the first recording device 314 or second recording device 324 of FIG. 3.

In some examples, identifying the portion of the second audio data may comprise receiving the second audio data from the second recording device. The second recording device may be different from a first recording device from which first audio data is received in operation 604. The second audio data may be transmitted separately from the first audio data. Accordingly, a first recording device and second recording device may independently record respective audio data for a same incident and transmit the respective audio to the server and/or computing device. The second audio data, including the portion of the second audio data, may not be identified in operation 610 until after the first audio data and the second audio data are transmitted to the server and/or computing device.

In some examples, identifying the portion of the second data may comprise determining proximity between the first and second recording devices. The server 210 and/or computing device 302 may determine proximity of the first and second recording devices based on a proximity signal (e.g., location signal) of each recording device. Proximity information regarding the proximity signal may be recorded by the first and/or second recording device. In other examples, proximity information may comprise time and location information (e.g., GPS and/or alignment beacon(s) or related data) recorded by respective recording devices, including the first recording device and/or the second recording device. The proximity information may be recorded in metadata associated with the first audio data and/or second audio data. Obtaining an indication of the distance between the first and second recording devices may comprise receiving the proximity information. The proximity information may be used by the server 210 and/or computing device 302 to determine proximity between the first and second recording devices. Accordingly, and in some examples, the proximity information may be recorded individually by the first and/or second recording device and then processed by the server and/or computing device to identify the portion of the second audio data after the first and second audio data have been transmitted to the server and/or computing device. The second audio data, including the portion of the second audio data, may not be identified to be recorded proximate to the first audio data in operation 610 until after the first audio data, the second audio data, and the proximity information are transmitted to the server and/or computing device.

In some examples, the identifying the portion of the second data may comprise determining the second recording device is within a threshold distance from the first recording device. The server and/or computing device may use proximity information received from the first and/or second recording device to determine the second recording device is within the threshold distance from the first recording device. Accordingly, the second audio data, including the portion of the second audio data, may not be identified to be recorded proximate to the first audio data in operation 610 until after the proximity information received by the server and/or computing device is further processed by the server and/or computing device.

In some example, the threshold distance may comprise a fixed spatial distance (e.g., within 10 feet) as discussed above. The second recording device may be determined to be proximate the first recording device in accordance with a comparison between the threshold distance and proximity information recorded by the first and/or second recording device indicating that the second recording device is within the threshold distance. The second recording device may be determined to not be proximate the first recording device in accordance with a comparison between the threshold distance and proximity information indicating that the second recording device is beyond (e.g., outside) the threshold distance. The server and/or computing device may use (e.g., process) the proximity information and the threshold distance to generate the comparison. In examples, the server and/or computing device may obtain an indication of distance between the first recording device and the second recording device in accordance with generating the comparison.

Alternately or additionally, the threshold distance may comprise a communication distance (e.g., communication range) as discussed above. The second recording device may be determined to be proximate the first recording device in accordance with proximity information indicating the first recording device received a signal (e.g., beacon, alignment signal, etc.) from the second recording device and/or the second recording device received a beacon and/or alignment signal from the first recording device. Obtaining an indication of distance between the first recording device and second recording device may comprise receiving the proximity information from the first recording device and/or second recording device, wherein the proximity information indicates the respective recording device received the signal from the other recording device.

In embodiments, obtaining an indication of a threshold difference may be distinct from a recording device being assigned to an incident. For example, recording device 204 and recording device 208 may each be assigned to an incident by a remote computing device (e.g., dispatch computing device). Assignment information indicating a relationship between the recording devices and the incident may be stored by the recording devices and/or the remote computing device. However, in some cases, the assignment information may not indicate that the pair of recording devices are proximate to each other while audio data is respectively recorded by each recording device. For example, a second recording device may still be approaching the incident while first audio data is recorded by the first recording device at the incident. Accordingly, identifying second audio data as recorded proximate first audio data may be independent of information generated by a remote computing device and/or transmitted to the recording devices from a remote computing device.

In some examples, identifying the portion of the second audio data may comprise identifying the second data recorded proximate during a period of time. The period of time may comprise a period of time during which a corresponding portion of the first audio data is recorded by the first recording device. The period of time may comprise a same period of time during which the corresponding portion of the first audio data is recorded by the first recording device. The period of time may be identified in accordance with timestamps, alignment signals, or other information recorded during the respective recording of each of the first audio data and the second audio data. Proximity information may also be respectively recorded by either or both of the first recording device and second recording device during respective recording of the first audio data and the second audio data. Accordingly, identifying the portion of the second audio data may comprise a comparison between a portion of the first audio data and the second audio data to identify a corresponding portion of the second audio data recorded proximate the first audio data and at a same period of time (e.g., same time) as the portion of the first audio data.

In operation 612, if second audio data is identified that was recorded by a device proximate to that used to record the first audio data, then the server 210 and/or the computing device 302 may further process the first and second audio data in later operations. If there does not exist second audio data recorded by a device that was proximate the device used to record the first audio data, the server 210 and/or the computing device 302 may proceed to operation 620 for transcription of the first audio data.

In operation 614, which is an optional operation, the server 210 and/or the computing device 302 may verify the portion of the first audio data corresponds to a portion of the second audio data which will be used to perform transcription. Verifying the portion of the first audio data may comprise verifying the first portion of the audio data relative to the portion of the second audio data. The verifying may be performed by comparing information from the portion of the first audio data and information from the portion of the second audio data. For example, the information may comprise an audio signal from each respective portion of the first audio data. In some examples, the server 210 and/or the executable instructions for transcription 306 may cause the computing device 302 to verify the second audio data corresponds to the first audio data by comparing audio signals for the first audio data and the second audio data in terms of (e.g., based on, relative to, etc.) frequency, amplitude, or combinations thereof. Comparing the audio signals in terms of frequency may comprise comparing the audio signals in a frequency domain. Comparing the audio signals in terms of amplitude may comprise comparing the audio signals in a time domain. In other examples, a common source between the first audio data and the second audio data may be identified based on spatialization and voice pattern recognition during at least the portion of the time at the incident.

In examples, the server 210 may verify the second audio data corresponds with the first audio data based on one or more of: audio domain comparison and/or source domain comparison. Audio domain comparison may include comparing underlying audio signals (e.g., amplitudes, frequencies, combinations thereof, etc.) for each audio data. For example, the second audio data may be verified to match the first audio data when an amplitude of an audio signal over time from the second audio data matches an amplitude of an audio signal from the second audio data. Alternately or instead, the second audio data may be verified to match the first audio data when one or more frequencies of an audio signal over time of the second audio data match one or more frequencies of an audio signal from the second audio data. Audio domain comparison may comprise comparing a waveform from the second audio data to a waveform of a second audio data. Audio domain comparison may indicate a same audio source is captured in each of the first audio data and second audio data. In source domain comparison the server 210 may verify that words in each audio data are received from a common source based on spatialization, voice pattern, etc., and confirm detected sources are consistent between the sets of audio data. In some examples, the verification may be based on a voice channel or a respective subset of the first audio data and the second audio data isolated from each other.

In examples, verifying the second audio data matches the first audio data may comprise determining a portion of audio data (e.g., portion of audio signal) is present in one of the first audio data and the second audio data (e.g., the first audio data only or the second audio data only) or both the first audio data and the second audio data. When the portion of audio data is only present in the first audio data, the second audio data may not be verified to match and/or the portion of audio data may be transcribed using the first audio data without reference to (e.g., independent of) the second audio data. When the portion of audio data is present in both the first audio data and the second audio data, the second audio data may be verified to match and/or the portion of audio data may be transcribed using information from both the first audio data and the second audio data. When the portion of audio data is only present in the second audio data, the second audio data may not be verified to match and/or the portion of audio data may not be transcribed. Accordingly, and in embodiments, a portion of audio data must be at least partially captured in the first audio data in order to form a basis on which a transcript for the first audio data is subsequently generated. A transcript generated based on first audio data may require a portion of audio data to be captured in the first audio in order for a word corresponding to the portion of audio data to be included in the transcript. Such an arrangement may provide various benefits to the technical field of mobile recording devices, including preventing an indication that second audio data may have been heard by a user of a first recording device when first audio data captured by the first recording device does not substantiate this indication. Such an arrangement may prevent combined transcription of audio data from multiple recording devices from generating an inaccurate transcription relative to a field of capture of the first recording device, including a field of capture represented in video data concurrently recorded by the first recording device, despite the multiple recording devices being disposed at a same incident.

In operation 616, if the portion of the second audio data is not verified to match the portion of the first audio data, then the server 210 and/or the computing device 302 may transcribe the portion of the first audio data as shown in operation 620. If the portion of the second audio data corresponds to the portion of the first audio data, the portions may be combined at operation 618. In accordance with operations 616 and 618, and when the second audio data is not verified to match the first audio data, second audio data can be prevented from being used to generate a transcript for the first audio data, even though the second audio data was recorded proximate the first audio data. When the second audio data is verified to match the first audio data, the server and/or computing device may subsequently transcribe the first audio data based on information from the second audio data.

In operation 618, the server 210 and/or the computing device 302 may utilize the audio data from the second recording device 208 in transcription of the audio data from the first recording device. Information from the second audio data used to transcribe the first audio data may comprise an audio signal in the second audio data. For example, portions of audio data from the second recording device may be combined with portions of the audio data from the first recording device. The portions used may be those that were recorded when the devices were in proximity and/or were verified to be corresponding per earlier operations of the method of FIG. 6.

In operation 618, the first audio data and second audio data may be combined. The first audio data and second audio data may be combined to generate combined audio data. Combining the first audio data and the second audio data may comprise combining a portion of the first audio data with a corresponding portion of the second audio data. Combining the first audio data and the second audio data may comprise combining information from the first audio data with information from the second audio data. The information may comprise an audio signal of each of the respective first audio data and the second audio data. For example, the first audio data and the second audio data may comprise combining an audio signal from the first audio data with an audio signal from the second audio data. Combining the first audio data and the second audio data may comprise boosting the first audio data with the second audio data. The second audio data may be used to boost the quality of the first audio data. For example, audio signals may be combined (e.g., added, merged, replaced, etc.) or a weighted or other partial combination may be performed. Boosting a portion of an audio signal in first audio data with a corresponding portion of an audio signal in second audio data may comprise at least one of substituting the portion of the audio signal in the first audio data with the corresponding portion of the audio signal in the second audio data, merging the portion of the audio signal in the first audio data and the corresponding portion of the audio signal in the second audio data, and/or cancelling background noise in the portion of the audio signal in the first audio data based on the corresponding portion of the audio signal in the second audio data. Combining the first audio data and second audio data may generate improved, combined audio data in which an amount, extent, and/or fidelity of an audio signal from an audio source is increased relative to the first audio data alone. The combined audio data may provide an improved, higher quality audio input for a subsequent transcription operation, thereby improving an accuracy of a transcript generated for the first audio data. The server 210 and/or computing device 302 may conduct transcription based on the combined audio signal in operation 620.

In operation 620, the server 210 and/or the computing device 302 may transcribe the combined audio data to generate a final transcript. Transcribing the combined audio data may comprise generating a word stream in accordance with the combined audio data. The word stream may comprise a set of candidate words for each portion of the combined audio data. For example, candidate words may be determined (e.g., generated) for each word represented in an audio signal from combined audio data. The candidate words with the highest confidence level may be selected in some examples for final transcription.

In operation 622, the transcription of the first audio data or the combined audio data is complete thus the transcription ends. The transcription may be stored (e.g., in memory), displayed, played, and/or transmitted to another computing device.

Figure 7:
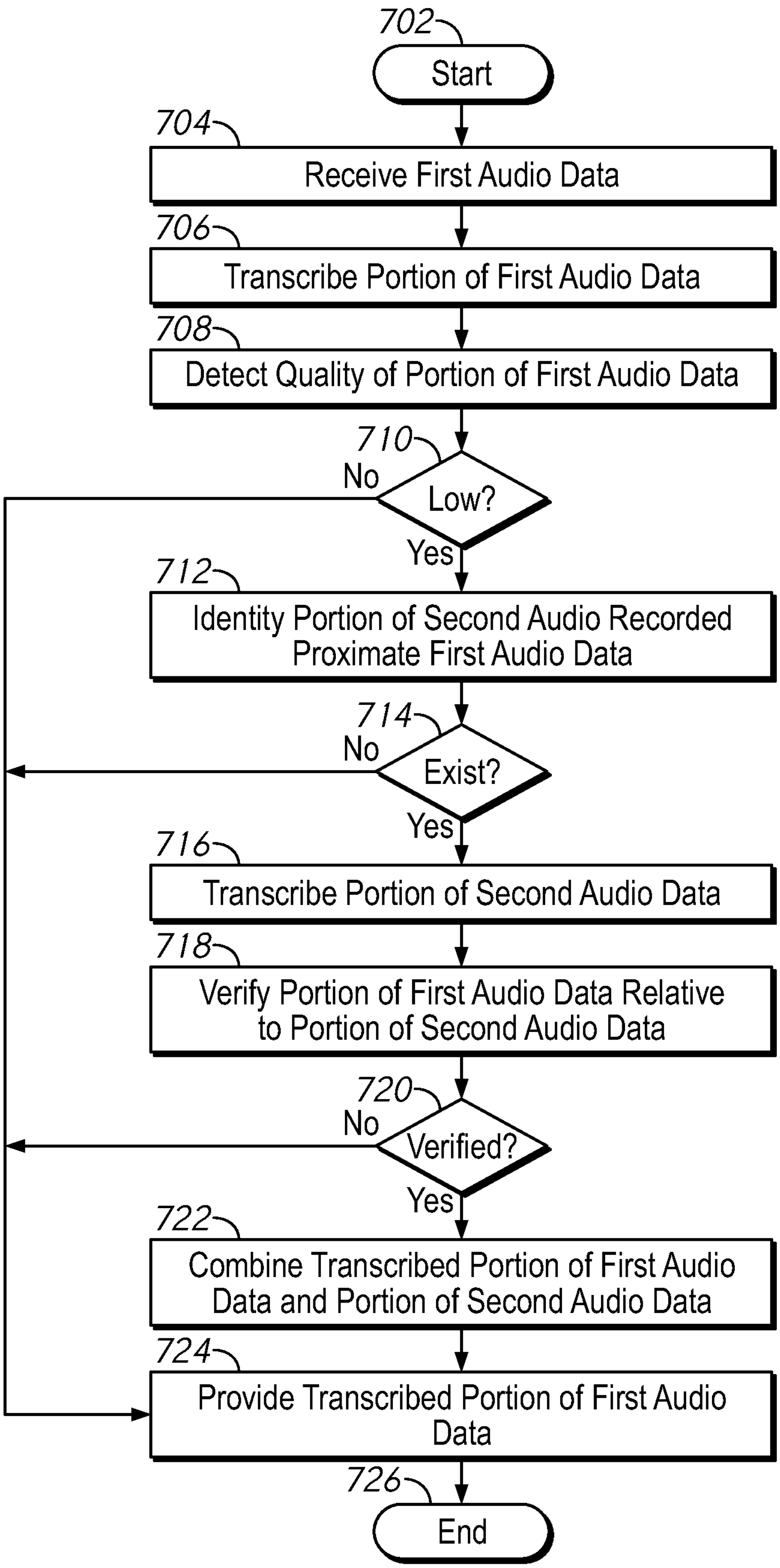
FIG. 7 depicts an example method of transcribing a portion of audio data, in accordance with examples described herein.

FIG. 7 depicts a method of transcription of audio data, in accordance with an embodiment of the present invention. Recall in the example of FIG. 6, portions of audio data from two (or more) recording devices may be combined, and the combined audio data transcribed using a transcription process to generate a final transcription. In the example of FIG. 7, portions of audio data from two (or more) recording devices may be transcribed, and the transcriptions (or candidate transcriptions) may be combined to form a final transcription.

In operation 702, the method of transcription of audio data starts. In some examples, the method may start at the server 210 of FIG. 2 or the computing device 302 of FIG. 3. In other examples, the processing circuit 810 of FIG. 4 may provide commands (e.g., instructions) to one or more other components for the component to start the operation.

In operation 704, a first recording device may receive a first audio data representative of the scene. In some examples, the first recording device may be implemented by any of the recording devices A, C, D, E, and H shown in FIG. 1, the first recording device 204 or second recording device 208 of FIG. 2, and/or the first recording device 314 or second recording device 324 of FIG. 3. In operation 704, the first recording device transmits the first audio data to a server and/or computing device for analysis and processing. In some examples, the server and/or computing device may be implemented by the server 210 shown in FIG. 2 and/or the computing device 302 shown in FIG. 3. The first audio data may be transmitted to the server and/or computing device as described above with respect to FIGS. 2 and 3 with brief reference to FIG. 6.

In operation 706, at least a portion of the first audio data received by the first recording device may be transcribed at the server and/or computing device. The server may be implemented by the server 210 of FIG. 2. The computing device may be implemented by the computing device 302 of FIG. 3. In some examples, the server and/or the computing device may include one or more processors to transcribe at least the portion of the first audio data received from the first recording device described herein to generate a word stream as described herein. Additionally or alternatively, the computing device may also include memory be used for and/or in communication with one or more processors to train a neural network with the audio signals. Examples of techniques described herein may be implemented in some examples using other electronic devices such as, but not limited to, tablets, laptops, smart speakers, computers, wearable devices (e.g., smartwatch), appliances, or vehicles. Generally, any device having processor(s) and a memory may be used. In some examples, the processors may include executable instructions for transcription (e.g., the executable instructions for transcription 306 as described in FIG. 3) that may cause the server and/or computing device generate a first set of candidate words based on the first audio data. In examples, transcribing the portion of the first audio data in operation 706 may comprise generating a confidence score for each word of the first set of confidence score. Accordingly, transcribing the portion of the first audio data in operation 706 may comprise generating information from the first audio data after the first audio data has been received by a server and/or computing device, independent of a second audio data.

In operation 708, which is an optional operation, the server and/or computing device may determine a quality of the portion of first audio data. The server 210 or computing device 302 may analyze the portion of the first audio data in the temporal domain in some examples using a recorded audio signal for the first audio data, in some examples. For example, an amplitude of the audio signal may be analyzed to determine a quality of the audio signal. In some examples, the server 210 and/or the computing device 302 may analyze the audio data of the first audio data in the frequency domain, such as by using a frequency filter. For example, one or more frequencies and/or amplitudes of the audio signal may be used to determine quality of the audio signal. The quality may be determined based on a comparison of amplitude against a threshold amplitude. For example, audio signals having an amplitude lower than the threshold may be determined to be of low quality.

In other examples, the server and/or computing device may determine the quality of the portion of the first audio data based on the transcription generated in operation 706. For example, in operation 706, multiple candidate words may be generated for each word in the audio data. A confidence score may be assigned to each of at least one word of the candidate words. In some examples, when the confidence score for a word, a group of words, or other portion of the audio data, is below a threshold score, the audio data may be determined to be of low quality.

In operation 708, in some examples if the quality is determined to be of low quality, the server 210 and/or computing device 302 may identify a portion of second audio data recorded proximate to the first audio data that corresponds to the portion of the first audio data. If the quality is not determined to be of low quality, in some examples then the transcription of the portion of the first audio data may be provided by the server 210 and/or computing device 302 at operation 724. If the quality is determined to be of low quality, the server 210 and/or computing device 302 may further process the portion of the first audio data in operation 712. Some examples may not utilize a quality determination, however, and operation 712 may proceed absent a quality determination.

In operation 710, if the quality is determined to be of low quality, the server 210 and/or computing device 302 may further process the audio data in operation 710. If the quality is not determined to be of low quality, then the audio data may be transcribed by the server 210 and/or computing device 302 at operation 724. Note that operation 710 is optional, such that a quality determination does not always precede use of another recording device's audio data to transcribe a particular recording device's audio data, however in some examples a low quality determination in operation 710 may form all or part of a decision to utilize other audio data during transcription.

In various embodiments according to aspects of the present disclosure, and as noted above, detecting a quality of audio data may be optional. For example, operations 708 and 710 may not be performed and/or other operations of a method of transcribing a portion of audio data may be performed independent of a quality of the audio data.

Operations 708 and 710 may be excluded (e.g., not included, not performed, etc.) according to various aspects of the present disclosure. Such embodiments may enable a transcript of each received audio data to be improved using information from other audio data, regardless of the quality of the received audio data.

In operation 712, the server 210 and/or computing device 302 may identify a portion of a second audio data that was recorded proximate the portion of the first audio data. The second audio may be recorded by a second recording device at the scene when the first audio data is acquired by the first recording device. The second recording device may be implemented by any of the recording devices A, C, D, E, and H shown in FIG. 1, the first recording device 204 or second recording device 208 of FIG. 2, and/or the first recording device 314 or second recording device 324 of FIG. 3. In some examples, the server 210 and/or computing device 302 may determine proximity of the first and second recording devices based on a proximity signal (e.g., location signal) of each recording device. Proximity information indicating the proximity signal may be recorded at an incident by one or more of the group comprising the first recording device and the second recording device. In other examples, proximity information such as time and location information (e.g., GPS and/or alignment beacon(s) or related data) may be used by the server 210 and/or computing device 302 to determine proximity between the first and second recording devices. In some examples, identifying the second portion recorded proximate the first audio data may be implemented as described for operation 610 with brief reference to FIG. 6.

In operation 714, if there exists a second audio data that is identified to be recorded proximate the first audio data, then the server 210 and/or the computing device 302 may further process the first and second audio data in later operations. If there does not exist a second audio data that is proximate the first audio data, the server 210 and/or the computing device 302 may proceed to operation 724 for providing a transcribed portion (e.g., transcription) of the first audio data. In examples, when a second audio data recorded proximate first audio data is not identified at operation 714, providing the transcribed portion may comprise providing a transcribed portion of the first audio data that is generated in accordance with information from the first audio data alone.

In operation 716, the portion of the second audio data that corresponds to the portion of the first audio data may be transcribed by the server. The portion of the audio data may be transcribed separately from the first audio data. The server may be implemented by the server 210 of FIG. 2. The computing device may be implemented by the computing device 302 of FIG. 3. In some examples, the second audio data may be transcribed in a similar fashion as the first audio data as described in operation 706. In other examples, other transcription methods described herein may be implemented by the server and/or the computing device. In other examples, the server and/or computing device may generate a second set of candidate words based on the second audio data.

In operation 718, which is an optional operation, the server 210 and/or the computing device 302 may verify a portion of the first audio data corresponds to a portion of the second audio data. Verifying the portion of the first audio data may comprise verifying the first portion of the audio data relative to the portion of the second audio data. Content of the first audio data may be verified relative to content of the second audio data. The verifying may be performed by comparing information from the portion of the first audio data and information from the portion of the second audio data. For example, the information may comprise an audio signal, an audio source captured in each audio data, and/or one or more candidate words transcribed from each respective portion of the first audio data. In some examples, the server 210 and/or the executable instructions for transcription 306 may cause the computing device 302 to verify the second audio data matches the first audio data by comparing audio signals for the first audio data and the second audio data in terms of frequency, amplitude, or combinations thereof. In other examples, a common source between the first audio data and the second audio data may be identified based on spatialization and voice pattern during at least the portion of the time at the incident.

In some examples, the server 210 may verify the second audio data corresponds with the first audio data based on one or more of: audio domain comparison, word matching domain comparison, and/or source domain comparison. Audio domain comparison may include comparing underlying audio signals (e.g., amplitudes) for each audio data in the time domain and/or frequency domain. For example, a waveform represented in the first audio data may be compared to a waveform represented in the second audio data. In word matching domain comparison, the server 210 may to compare the candidate words for sets of transcribed words generated for the first and second audio data and determine if the sets are in agreement. For example, comparison may be performed to determine whether candidate words and/or a word stream generated from each of the first and second audio data comprise a minimum number of matching candidate words. In source domain comparison the server 210 may verify that words in each audio data are received from a common source based on spatialization, voice pattern, etc., and confirm detected sources are consistent between the sets of audio data. In some examples, the verification may be based on a voice channel or a respective subset of the first audio data and the second audio data isolated from each other.

In operation 720, if the portion of the second audio data is not verified to match the portion of the first audio data, then the server 210 and/or the computing device 302 provides a transcribed portion of the first audio data as shown in operation 724, wherein the transcribed portion comprises a transcription generated from the first data alone, not using information from the second audio data. If the portion of the second audio data corresponds to the portion of the first audio data, the transcribed portions may be combined at operation 722.

In operation 722, the server 210 and/or the computing device 302 may combine transcribed portions of audio data from the second recording device 208 with transcribed portions of the audio data from the first recording device which were recorded when the devices were in proximity. The server 210 and/or computing device 302 and may utilize portions of the transcription of the second audio data to confirm, revise, update, and/or further transcribe the first audio data. For example, for a given spoken word in the audio data, there may be a first set of candidate words in the transcription of the first audio data. Each of the first set of candidate words has a confidence score. There may be a second set of candidate words in the transcription of the second audio data. Each of the second set of candidate words has a confidence score. The word used in the final transcription may be selected based on both the first and second sets of candidate words and their confidence scores. For example, the final word may be selected which has the highest confidence score in either set. In some examples, the final word may be selected which has the total highest confidence score when the confidence scores from the first and second sets are summed. Other methods for combining confidence scores and/or selecting among candidate words in both the first and second sets of words may be used in other examples.

In operation 724, the server 210 and/or the computing device 302 may provide the final transcription (e.g., the combined transcription of the first and second audio data). In some examples, there may be no appropriate (e.g., proximately-recorded, verified, etc.) second audio data available. Where there is no second audio data available, the transcribed portion of the first audio data may comprise information (e.g., one or more candidate words, confidence scores, etc.) generated from the first audio data at operation 706 alone. Where second audio data is identified as recorded proximate the first audio data, the transcribed portion of the first audio data may comprise information generated using information from both the first audio data generated at operation 706 and information generated from the second audio data at operation 716. The server 210 and/or computing device 302 may keep transcribed text data for a final transcript. Text data may be kept, or the transcribed portion of the first audio data may be used independent of whether the second audio data exists from the incident during that portion of time. Providing the transcribed portion of the first audio data may comprise storing the final transcription (e.g., in memory), displaying the final transcription, playing sequential portions of the final transcription with or without other audiovisual data, and/or transmitting the final transcription to another computing device. In embodiments, the final transcription may be displayed or played with audiovisual data captured the first recording device at the incident. Accordingly, the final transcription may improve playback of data recorded by a single recording device, though the final transcription may be augmented with information from other audio data recorded by another recording device at the incident. Providing the final transcription may include displaying the final transcription with the audiovisual information recorded by the first recording device alone, enabling the display to present a perspective of a single recording device at the incident, despite a presence of other recording devices at the incident. Such an arrangement may prevent the final transcription from indicating that words solely captured by another recording device at the incident were heard by a user of the first recording device. This arrangement according to various aspects of the present disclosure may require an audio signal for a word in the final transcript to at least be partially captured by the first recording device in order for the word to be included in the final transcript associated with the first audio data. In examples, the audio signal may be captured with a lower quality than in second data, and then improved using information from the second audio data, but a minimal, non-zero amount of information may be captured in the first audio data in order to prevent false attribution of a detected word to the first recording device or user of the first recording device.

In operation 726, a transcription corresponding to the portion of the first audio data is provided thus the transcription ends.

In embodiments, operations of FIGS. 6 and 7 may be repeated for multiple portions of a same first audio data recorded at an incident. The repeated operations may comprise same or different outcomes for the multiple portions. For example, an audio data may comprise one minute of audio data recorded continuously, but a second recording device recording a second audio data may only be proximate a first recording device recording the audio data during a last thirty seconds of the audio data. Accordingly, a second audio data may not be identified as recorded proximate the audio data for a first portion of the audio data comprising a first thirty seconds of the audio data, but upon repeated execution of operations of FIGS. 6 and 7, the second audio data may be identified for a second portion of the audio data comprising the last thirty seconds of the audio data. A final transcription of the audio data may comprise a word stream generated from the first audio data alone as well as the first audio data using information from the second audio data. In other examples, the second audio data may be identified as (e.g., to be, to have been, etc.) recorded proximate or not proximate the audio data for all portions of the audio data. Accordingly, embodiments according to various aspects of the present disclosure enable transcription of audio data to be selectively and automatically improved using information from other audio data recorded at a same incident when this information is available.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various modifications are possible within the scope of the disclosure Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

What is claimed is:

1. A method comprising:

obtaining first audio data recorded at an incident with a first recording device;

obtaining a first indication of distance between the first recording device and a second recording device during at least a first portion of a time the first audio data was recorded;

obtaining second audio data recorded by the second recording device during at least the first portion of the time the first indication of distance meets a proximity criteria;

transcribing the first audio data using information from the second audio data during the first portion of the time the distance meets the proximity criteria;

obtaining a second indication of distance between the first recording device and the second recording device during a second portion of the time the first audio data was recorded;

obtaining third audio data recorded by the second recording device during the second portion of the time;

determining the second indication of distance between the first recording device and the second recording device during the second portion of the time does not meet the proximity criteria; and responsive to determining the second indication of distance between the first recording device and the second recording device during the second portion of the time does not meet the proximity criteria, transcribing the first audio data recorded during the second portion of the time independent of the third audio data.

2. The method of claim 1, wherein the transcribing comprises:

generating a first set of candidate words based on the first audio data and a second set of candidate words based on the second audio data;

assigning a confidence score for each of the candidate words in the first set and the second set; and generating a word stream comprising selected candidate words based on the confidence scores for the first set of candidate words and the second set of candidate words.

3. The method of claim 2, wherein the selected candidate words comprise the candidate words having a highest combined confidence score in the first set and the second set.

4. The method of claim 3, wherein the candidate words having the highest combined confidence score are determined by combining confidence scores for each of one or more corresponding candidate words in the first set and the second set.

5. The method of claim 1, wherein obtaining the first and second indications of distance device comprises:

measuring a signal strength of a signal received at the first recording device from the second recording device.

6. The method of claim 1, further comprising:

verifying the second audio data matches the first audio data, wherein when a portion of audio data is present in only the second audio data, the portion of the audio data is transcribed from the first audio data without reference to the second audio data.

7. The method of claim 6, wherein verifying the second audio data matches the first audio data comprises:

prior to transcribing the first audio data, comparing audio signals for the first audio data and the second audio data with regard to frequency, amplitude, or combinations thereof.

8. The method of claim 7, wherein transcribing the first audio data comprises:

responsive to verifying the second audio data matches the first audio data by comparing the audio signals, combining the first audio data and the second audio data to generate combined audio data; and transcribing the combined audio data corresponding to the first portion of the time the distance meets the proximity criteria.

9. The method of claim 6, wherein the first recording device comprises a first wearable camera and the second recording device comprises one of a second wearable camera and a vehicle-mounted recording device.

10. A non-transitory computer readable medium comprising instructions that, when executed, cause a computing device to perform operations comprising:

receiving first audio data recorded during a time by a first recording device at an incident, the first recording device separate from the computing device;

after the first audio data is received by the computing device, identifying, by the computing device, second audio data recorded by a second recording device separate from the computing device, wherein identifying the second audio data comprises determining, by the computing device, the second audio data was recorded during at least a first portion of the time when a first indication of distance indicates that the second recording device was within a threshold distance of the first recording device at the incident;

responsive to identifying the second audio data, combining information from the first audio data with information from the second audio data;

transcribing a first portion of the first audio data based on the information combined from the first audio data and the second audio data, the first portion of the first audio data recorded during the first portion of the time;

identifying third audio data recorded by the second recording device by determining that the third audio data was recorded during a second portion of the time when a second indication of distance indicates that the second recording device was not within the threshold distance of the first recording device; and transcribing a second portion of the first audio data independent of the third audio data, the second portion of the first audio data recorded during the second portion of the time.

11. The non-transitory computer readable medium of claim 10, wherein combining information from the first audio data with the information from the second audio data comprises:

generating a first set of candidate words for the first portion of the first audio data to provide the information from the first audio data;

generating a second set of candidate words for the second audio data to provide the information from the second audio data;

assigning a confidence score for each of the candidate words in the first and second sets; and generating a word stream comprising candidate words from the first and second sets having a highest overall confidence score based on a comparison between the first set of candidate words and the second set of candidate words for the first portion of the first audio data and the second audio data.

12. The non-transitory computer readable medium of claim 11, wherein the operations further comprise verifying the information from the first audio data matches the information from the second audio data prior to combining the information from the first audio data with the information from the second audio data.

13. The non-transitory computer readable medium of claim 10, wherein:

the information from the first audio data comprises an audio signal in the first audio data;

the information from the second audio data comprises an audio signal in the second audio data; and combining the information from the first audio data with the information from the second audio data comprises boosting a portion of the audio signal in the first audio data with a corresponding portion of the audio signal in the second audio data.

14. The non-transitory computer readable medium of claim 13, wherein boosting the portion of the audio signal in the first audio data with the corresponding portion of the audio signal in the second audio data comprises at least one of following operations:

substituting the portion of the audio signal in the first audio data with the corresponding portion of the audio signal in the second audio data;

merging the portion of the audio signal in the first audio data and the corresponding portion of the audio signal in the second audio data; or cancelling background noise in the portion of the audio signal in the first audio data based on the corresponding portion of the audio signal in the second audio data.

15. The non-transitory computer readable medium of claim 10, wherein identifying the second audio data comprises identifying the second audio data in accordance with proximity information recorded by at least one of the first recording device or the second recording device, the proximity information recorded prior to receiving the first audio data.

16. A system comprising:

a first recording device configured to obtain first audio data during a time at an incident;

a second recording device configured to obtain second audio data during at least a first portion of the time and third audio data during at least a second portion of the time; and a server configured to perform operations comprising:

receiving the first audio data, the second audio data, and the third audio data;

after the first audio data, the second audio data, and the third audio data are received by the server, identifying, by the server, if the second audio data was recorded by the second recording device when a first indication of distance indicates that the second recording device was in proximity with the first recording device;

responsive to identifying the second audio data was recorded by the second recording device during the first portion of the time when the first indication of distance indicates that the second recording device was in proximity with the first recording device, transcribing a first portion of the first audio data using information from the second audio data during the first portion of the time;

identifying if the third audio data was recorded by the second recording device during a second portion of the time when a second indication of distance indicates that the second recording device was not in proximity with the first recording device; and responsive to identifying that the third audio data was recorded by the second recording device during the second portion of the time when the second indication of distance indicates that the second recording device was not in proximity with the first recording device, transcribing a second portion of the first audio data independent of the third audio data, the second portion of the first audio data recorded during the second portion of the time.

17. The system of claim 16, wherein transcribing the first portion of the first audio data comprises:

generating a first set of candidate words based on the first audio data;

transcribing the second audio data to generate a second set of candidate words based on the second audio data corresponding to the first portion of the first audio data; and combining the first set of candidate words and the second set of candidate words to generate a word stream.

18. The system of claim 17, wherein:

transcribing the first portion of the first audio data further comprises assigning a confidence score to each candidate word in the first set of candidate words and the second set of candidate words, wherein the first set of candidate words and the second set of candidate words comprise multiple candidate words; and combining the first set of candidate words and the second set of candidate words comprises combining the first set of candidate words and the second set of candidate words based on the confidence scores of the multiple candidate words of the first set of candidate words and the second set of candidate words.

19. The system of claim 16, wherein the first and second recording devices are configured to transmit the first audio data, the second audio data, and the third audio data to the server based on a keyword indicating immediate transmission to the server.

20. The system of claim 16, wherein the server is further configured to identify the second audio data as recorded proximate the first audio data in accordance with proximity information recorded at the incident by at least one of the first recording device or the second recording device.

* * * * *